US012650168B2

(12) United States Patent
Rinaldi et al.

(10) Patent No.: US 12,650,168 B2
(45) Date of Patent: Jun. 9, 2026

(54) RADIAL HOLE ARRANGEMENT INTERCEPTING A ROTATIONAL LUBRICATION LINE PARALLEL TO AND NON-COAXIAL WITH THE ROTATIONAL AXIS

(71) Applicant: DANA ITALIA S.R.L., Arco (IT)

(72) Inventors: Pier Paolo Rinaldi, Arco (IT); Giuseppe Manica, Arco (IT); Matteo Stefani, Reggio Emilia (IT)

(73) Assignee: DANA ITALIA S.R.L., Arco (IT)

( * ) Notice: Subject to any disclaimer, the term of this patent is extended or adjusted under 35 U.S.C. 154(b) by 164 days.

(21) Appl. No.: 18/587,230

(22) Filed: Feb. 26, 2024

(65) Prior Publication Data
US 2025/0271057 A1      Aug. 28, 2025

(51) Int. Cl.
*F16H 57/04*          (2010.01)

(52) U.S. Cl.
CPC ................................ *F16H 57/0426* (2013.01)

(58) Field of Classification Search
CPC ............................ F16H 57/043; F16H 57/0426
See application file for complete search history.

(56) References Cited

U.S. PATENT DOCUMENTS

| | | | | |
|---|---|---|---|---|
| 5,474,152 A * | 12/1995 | Wilkinson | .............. | F02N 15/00 |
| | | | | 192/113.32 |
| 6,675,943 B2 * | 1/2004 | Organek | ............... | F16D 27/115 |
| | | | | 192/113.34 |

| | | | | |
|---|---|---|---|---|
| 7,992,668 B2 * | 8/2011 | Smith | ..................... | F16D 3/185 |
| | | | | 180/245 |
| 8,070,465 B2 * | 12/2011 | Ginies | ................... | F04C 29/023 |
| | | | | 418/94 |
| 10,309,522 B2 * | 6/2019 | Palazzolo | .............. | B60K 17/35 |
| 11,054,017 B2 * | 7/2021 | Nomura | .............. | F16H 57/0447 |
| 11,512,771 B2 * | 11/2022 | Stroope | ..................... | F16C 3/02 |
| 12,270,466 B1 * | 4/2025 | Marini | ............... | F16H 57/0471 |
| 12,377,804 B2 * | 8/2025 | Filkins | ............... | F16H 57/0472 |
| 2013/0118302 A1 | 5/2013 | Poon et al. | | |
| 2017/0152933 A1 * | 6/2017 | Drill | ....................... | F16D 13/52 |
| 2023/0064580 A1 * | 3/2023 | Filkins | ............... | F16H 57/0441 |
| 2025/0271057 A1 * | 8/2025 | Rinaldi | ................. | F16H 57/043 |

FOREIGN PATENT DOCUMENTS

| | | | | | |
|---|---|---|---|---|---|
| CN | 109695706 A | * | 4/2019 | ........ | F16H 57/0471 |
| DE | 19501799 C2 | | 8/2003 | | |
| JP | H08291850 A | * | 11/1996 | | |
| JP | 3496513 B2 | * | 2/2004 | ........... | F16H 57/043 |

* cited by examiner

*Primary Examiner* — Michael A Riegelman
(74) *Attorney, Agent, or Firm* — McCoy Russell LLP

(57)          ABSTRACT

A lubrication system for a transmission, comprising: a shaft of the transmission having a fluid passage, where the fluid passage is centered on an axis that is parallel and non-coaxial to a rotational axis of the shaft, where the shaft is centered on the rotational axis; and at least two axially spaced apart radial channels, where the two axially spaced apart radial channels are fluidly communicating with the fluid passage and inclined at different angles with respect to a plane that cross-sections the shaft in a longitudinal direction with respect to the rotational axis, where the plane includes the rotational axis and the axis of the fluid passage, where the different angles decrease in size for each axially spaced apart radial channel that is further from an inlet relative to a previous spaced apart radial channel.

18 Claims, 9 Drawing Sheets

RADIAL HOLE ARRANGEMENT INTERCEPTING A ROTATIONAL LUBRICATION LINE PARALLEL TO AND NON-COAXIAL WITH THE ROTATIONAL AXIS

TECHNICAL FIELD

The present description relates to a shaft incorporating a lubrication system. The shaft and lubrication system includes a lubrication line that is parallel with and non-coaxial with a rotational axis of the shaft. The lubrication system distributes fluid to and lubricates support structures for rotational elements of a transmission housing the shaft.

BACKGROUND AND SUMMARY

Vehicles, such as electrified vehicles, may have a transmission to switch gears of a plurality different ratios, where each of the different ratios may output different torques and rotational speeds with the same input torque. At higher rotational speeds, the efficiency at which thermal energy is removed from and friction is reduced to components of the transmission via lubrication is prioritized. Friction force greater than a first threshold and thermal energy greater than a second threshold may cause degradation to the transmission. A lubricant may be driven to lubricate the transmission via a pump or a plurality of pumps.

In an example transmission with rotating shafts, each shaft may be hollow, having a central passage coaxial with the centerline and axis of rotation of the shaft, and a plurality of radially arranged channels configured to deliver lubricant from the central passage to components of the transmission. However, in such an arrangement, the volume of lubricant delivered to the channels may decrease with distance from the lubricant supply (e.g., the pump), resulting in fluid starvation for some channels. Fluid starvation may increase in severity at higher rotational speeds of a shaft, as lubricant is driven out of the channels at greater volumetric flowrates. In some examples, the lubricant may be fully depleted before reaching a channel. Likewise, when a channel experiences fluid starvation, the lubricant may reduce fluid levels above a surface of the central passage below a first threshold. Below the first threshold fluid may not flow through the channels at a volumetric flowrate adequate for a consumer. Further, adhesion with the surface of the passage or turbulence may reduce lubricant entering the channel below a minimum flowrate to lubricate components complementary to the channel. Fluid starvation may cause degradation to components of the transmission.

Fluid starvation may be addressed via increasing the volumetric flowrate to the central passage. Volumetric flowrate may increase the fluid levels above the surface of the central passage. Volumetric flowrate may be increased via increasing the pressure of the pump supplying an inlet of each shaft and each of their respective central passages. Increasing the pump pressure of the pump may increase the power losses of the lubrication system, decreasing the lubrication systems efficiency and the transmission system efficiency, relative to power/energy usage and heat removal. Additionally, fluid starvation may be addressed by decreasing dimensions (e.g., volume, diameter) of the additional channels. However, decreasing the dimensions the channels may add complexity to the production process and may increase channel clogging and blocking, reducing lubrication via the channel.

A lubrication system for a transmission, comprising: a shaft of the transmission having a fluid passage, where the fluid passage is centered on an axis that is parallel and non-coaxial to a rotational axis of the shaft, where the shaft is centered on the rotational axis; and at least two axially spaced apart radial channels, where the two axially spaced apart radial channels are fluidly communicating with the fluid passage and inclined at different angles with respect to a plane that cross-sections the shaft in a longitudinal direction with respect to the rotational axis, where the plane includes the rotational axis and the axis of the fluid passage, where the different angles decrease in size for each axially spaced apart radial channel that is further from an inlet relative to a previous spaced apart radial channel.

Offsetting the axial passage from the axis of rotation may prevent or reduce lubricant from spreading around an inner surface of the axial passage. Offsetting the axial passage from the axis of rotation, may allow for lubricant in the axial passage to have a maximum height and a minimum height, where height may be the distance between the nearest point on the surface of the axial passage and surface of the lubricant. The offset axial passage may be centered radially around a first axis that is parallel with the axis of rotation. The lubricant may accumulate and have a fluid level at the maximum height from the inner surface at a second axis on the inner surface. The second axis extends in parallel with the first axis and the rotational axis, and is at a position on the inner surface that is approximately the furthest from the axis of rotation. Each of the radial channels may have an inner opening and an outer opening, placing the radial channels in fluid communication with the axial passage and with an outer surface of the shaft, respectively. Each inner opening may be placed to be flush with the line. The maximum height is such that above the inner openings, to reduce resistance from adhesion between the inner surface and fluid that may prevent or reduce flowrate of lubricant entering the inner openings. In such an arrangement the radial channels may be feed channels. Likewise, the least two axially spaced apart radial channels, may be angled with respect to the height, where the height is included by a plane that cross-sections the shaft in a longitudinal direction with respect to the axis of rotation. At rotational speeds at or above a first threshold, the shaft may have one or more radially directed forces acting on the lubricant, reducing the splashing of lubricant in the axial passage, therein reducing power losses. At rotational speeds at or above a second threshold, the shaft may have centripetal force such that the surface of the lubricant in the axial passage may be an approximately fluid-free surface. Such an arrangement may enable a constant volumetric flow of fluid through each of the axially spaced apart radial channels. There may be a plurality of axially spaced apart radial channels greater than two.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
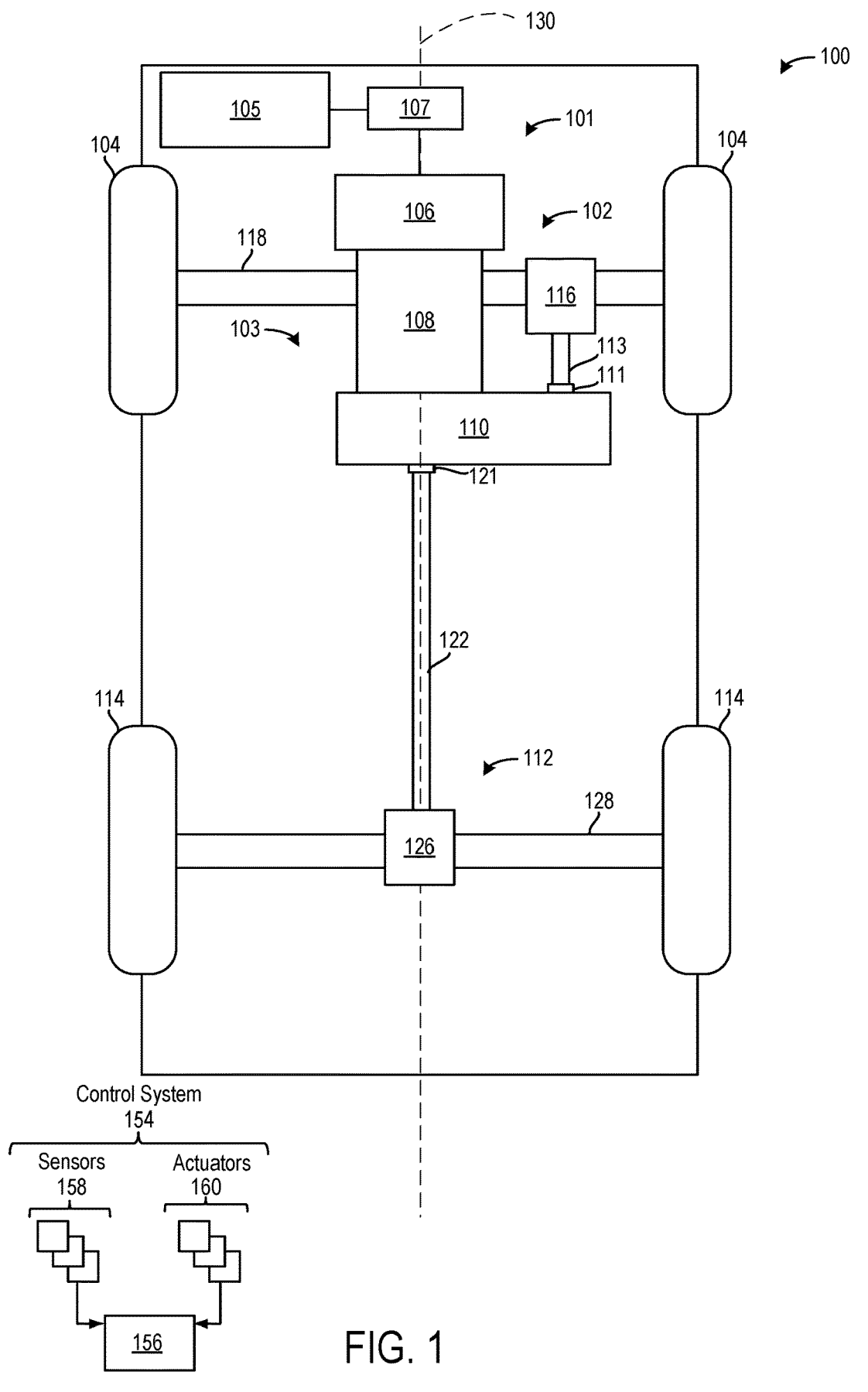
FIG. 1 shows an example schematic of a vehicle which may include the transmission of the present disclosure.

The following description relates to one or more shafts integrated as a part of a lubrication system. Each shaft is in fluid communication and supplied with lubricant. For an example lubricant may be supplied to one or more of the shafts via a pump. For another example lubricant may be supplied to one or more of the shafts via gravity. At least one of the shafts has an axial passage parallel to an axis of rotation of the shaft and non-coaxial to the axis of rotation, where the axial passage is centered on an axis parallel with the axis of rotation. One, more, or all of the shafts may include an axial passage specific to that shaft. Each shaft that includes the axial passage includes at least two axially spaced apart radial channels fluidly communicating with the axial passage. There be two or more of the axially spaced apart radial channels. Each of the axially spaced apart radially channels may incline at different angles each with respect to a plane that cross-sections the shaft in a longitudinal direction with respect to the rotational axis. The plane includes the rotational axis and the axis the fluid passage is centered on. Each of the radial channels may incline and extend at a different angle from the other radial channels the shaft includes. The radial channels may incline and extend with the different angles, such that a centerline (e.g., axis) the radial channel is centered on inclines and extends at an angle of the different angles. The axial passage has at least a first opening, where the first opening may be at an end of the shaft, and may have an area normal to an axis of rotation. The first opening may be an inlet, and may receive lubricant from at least a pump. Each of the different angles decrease in size for each axially spaced apart radial channel that is further from the inlet relative to a previous spaced apart radial channel.

Each shaft may distribute fluid to consumers of lubricant positioned about the shaft, such as around the shaft, via a plurality of fluid channels and complementary openings in fluid communication with one or more outer surfaces of the shaft. The fluid channels may be positioned radially about and extend in a radial direction from the axial passage. The fluid channels may extend radially outward at a plurality of differing angles from the axial passage. Each of the fluid channels may have an inner opening and an outer opening, where the inner opening is flush and contiguous with the surface of the axial passage, and the outer opening is contiguous and flush with an outer surface of the shaft. Some consumers may be complementary to at least a fluid channel, such that the consumers may be positioned around the outer opening of a complementary fluid channel of the fluid channels. Other consumers may be in close enough proximity to the outer opening of a fluid channel of the fluid channels to be lubricated via the outer opening. The shaft including the axial passage may have a plurality of inner and outer diameters, where the inner and outer diameters may vary and be of differing sizes. The shape of the shaft may be non-limiting, wherein the shaft may have a plurality of surfaces, lands, and other features with different diameters extending outward and/or radially from a cylindrical or partially cylindrical core of the shaft.

Gearboxes, transmissions, and drivetrains are to receive lubrication, as well as any mechanical system having moving/rotating/rolling/sliding components such as gears or bearings. Moreover, for the good functioning of the system, lubricant is to be available in the most features and components of rotational elements that may accumulate heat or experience friction (e.g., bearings, gear mesh, and so on) at any moment. It is common practice to use a volumetric pump, electrically or mechanically driven, to create a lubrication flow that can be effectively channeled towards the components that may receive lubrication and cooling. The lubrication system of the present disclosure may be used for a transmission that is a gearbox, an axle, or a trans-axle. Additionally, the lubrication system of the present disclosure may be used for a system of gearsets or other reduction sets that are not part of a transmission, such as in a gearbox that is not a transmission. The transmission and gearbox may be an eight-speed configuration in a two-shafts scheme; however, the transmission and gearbox may be of other schemes. For example, the transmission and/or gearbox may have more or less ratios than an eight-speed transmission/gearbox. For this or another example the transmission and/or gearbox may have a shaft scheme with a greater amount of shafts than two shafts.

Further, the shafts are approximately horizontal with respect of the gravitational field. The shafts may each have at least a fluid passage via which fluid may flow through as the respective shaft of the fluid passage is driven to rotate. The fluid passage of the shaft intended to channel the oil flow, supplied at a first end of the shaft to a plurality of bearings, such as a plurality of needle roller bearings, of one or more idling gears. The fluid passage may be a bore, such as a gun drill bore. A plurality of channels may be in fluid communication with the fluid passage of the shaft. The channels may be positioned radially around and extend in a radially outward direction from the fluid passage, the channels may be referred to herein as radial channels. The idling gears may be positioned closest to a second end from the first end, where the second end is on the opposite side of the upper shaft from the first end. Each idling gear may be complementary to and be supported by a set of bearings or a plurality of sets of bearings, such as needle roller bearings. The idling gears and bearings complementary to the idling gears may be positioned around the shaft, such that the idling gears and bearings may be positioned radially about the shaft. Each idling gear and bearings to the idling gears may be supplied with lubricant by at least a radial channel of the radial channels.

For an example there may be at least four idling gears with complementary needle roller bearings for lubrication. For this or another example, the amount of radial channels, such as feed holes, specific for lubricating each idling gear may vary. There may be two sets of bearings closest to the first end and there may be two sets of bearings closest to the second end. The two sets of bearings closest to the first end may be complementary to and lubricated via a single radial channel. The two sets of bearings nearest to the second end may be complementary to and lubricated by multiple feed holes. The flow injected in the first end of the shaft is such that the progressive drainage of the first bearings holes allows for a minimum oil left to avoid lubrication starvation at the furthest user. The faster the rotational speed of the shaft, the more volumetric flow rate the first hole will drain oil away from the cascaded users, exposing even more of the rearmost bearing or bearings. In this context, when more exposed the bearing or bearings are coated with less lubricant compared to a less exposed or non-exposed bearing or bearings. To overcome this problem, the oil delivered to the shaft is such that the first holes cannot drain all the flow, leaving a sufficient amount to the last hole. In general, for a fast-spinning shaft, the amount of oil drained at a first volumetric flowrate by a 2 millimeters hole exceeds the amount of lubricant at a second volumetric flowrate to keep the bearing cooled and lubricated. Decreasing the diameter of the hole adds complexity to the production process and may increase hole clogging. Hole clogging may cause degradation, via starving a consumer at a hole, channel, or another tributary passage of lubricant. Using hole diameters relying on best practice technology may thus result in oil flow oversizing, requiring a bigger pump and increasing an undue splashing power loss that is lowering the overall transmission efficiency. Transmission efficiency may be desired, particularly for eco-friendly and sustainable battery electric vehicles. Overall transmission system efficiency may relate to both the heat removed by the lubrication system and/or the amount of energy consumed by the transmission. A transmission that has more friction and/or experiences splashing may have increased power losses and be less efficient.

Users to be lubricated may be lubricated at a volumetric flowrate above a first threshold, where the first threshold is a minimum volumetric flowrate, with a sufficient margin. With a sufficient margin, the functional minimum volumetric flow rate may be increased by at least an order of magnitude above an actual minimum. The functional and actual minimum flowrate for bearings and other consumers may be dependent on the power ratings for a transmission. For example, the transmission of the present disclosure may be a 200 kilowatt transmission and the actual minimum volumetric flowrate may be 0.1 liter per minute (L/min) for each bearing of a plurality of bearings. For this example, the transmission may have a functional minimum volumetric flow rate that is at or above a threshold of approximately 0.6 L/min. For delivering the minimum volumetric flow, a first diameter of 3 mm may be sufficient; however, the fluid passage be a second diameter that may be substantially larger, such as of 20 millimeters. Substantially may be relative to two or more components, features, or measurement being compared, where a component substantially greater than or less than another component by a factor of two or more, unless otherwise specified. At the minimum volumetric flow through second diameter, the resulting flow from the fluid mechanics and through the fluid passage may be an open-channel flow. In open-channel flow, fluid, such as lubricant, in the fluid passage may the exhibit a fluid-free surface, where the fluid moves under the action of the applied field of force or forces rather than under a pressure gradient. The applied field of forces may include the centripetal force from the rotation of the shaft and the force of gravity. The applied field of forces may drive lubricant from fluid-free surface in a radial direction from the axis of rotation. There may be a fluid-free surface with an approximately constant pressure along the fluid passage. (This applies to low flow figures on fluid passages above a threshold of diameter; in the case of the oversized flow, to transport lubricant to the farthest bearing, the flow is a pipe-flow without any fluid-free surface and a pressure drop along the line (fluid passage) drive the fluid).

For this or another example, the shaft may additionally or alternatively have at least a second fluid passage. The shaft axis may lay in a horizontal plane with respect to the gravitational field. The second fluid passage may be offset from the rotational axis and centerline of the shaft. But the second fluid passage may still be positioned around, such as parallel with, and centered on an axis that is parallel with the rotational axis and centerline of the shaft. The second fluid passage may alternatively be referred to as an axial passage. The second fluid passage may be a bore, such as a gun drilled bore. The second fluid passage may have a plurality of first fluid channels and a plurality second fluid channels that are in fluid communication and extend in a radial direction from the second fluid passage. The first fluid channels may be axially separated fluid channels similar to the axially separated fluid channels described above. The first fluid channels may be bleed holes, and may each supply lubricant to one or a plurality of utilizers. The second fluid channels may transport and distribute fluid, such as lubricant from the second fluid passage to outer surfaces of the shaft. Each of the second fluid channels may be complementary to at least a user, where the user may be positioned about, such as around, the surface that a complementary second fluid channel of the second fluid channel distributes lubricant to. Users may alternatively be referred to as consumers. The second fluid channels may be referred alternatively as second fluid distribution channels. The second fluid channels may be offset of the second fluid passage, such as extending radially outward from the second fluid passage. The second fluid passage may feed a plurality of users (consumers) via the second fluid channels, where each of the second fluid channels may feed a specific user or a plurality of users.

The second fluid passage has a single opening, where the opening is an inlet for lubricant to be fed. Whether the lubricant is fed from the first or second end of the shaft, such as from a left or right end, each of the first fluid channels and each of second fluid channels may drain the lubricant flow to one or two utilizers downstream of it via an opening. The openings of each of the first channels and each of the second fluid channels may have a first threshold diameter to satisfy a minimum flowrate. For example, the first fluid channels may have an opening of at least a diameter of 4 millimeters (mm). Therefore, to achieve a minimum oil flow to the farthest of the users, it is the pressure on the second fluid passage that balances the oil flow amongst the at least four second fluid channels. To meet the pressure and a minimum flow rate for users, each of the second fluid channels may have a second threshold diameter. For example, the second fluid channels may have an orifice of at least 1.6 mm in diameter. Likewise, each of the second fluid channels may have a minimum length, such as 17 mm or above. For this example, one or more of the second fluid channels may have a constant diameter equal to the threshold diameter. For this or another example, one or more of the second fluid channels may have a variable diameter, including diameters that are less than and/or greater than the threshold diameter of the opening.

For example, there may be two users of lubricant, which are two needle roller bearings and two radial holes of a shaft, where each radial hole may supply a separate needle roller bearing with lubricant. Each radial hole may be fluidly coupled to an axial passage of the shaft. The axial passage is centered on an axis of the shaft. The axial passage may have an opening via which fluid may be fed to the axial passage. The radial hole closest to the opening with respect to and along the axis may be referred to in the example as a first user. The radial hole furthest from the opening with respect to and along the axis may be referred to in the example as a second user. Each bearing that may be supplied with lubricant via a user may have a minimum threshold rate of flow, such as 0.1 L/min. The minimum threshold flowrate may be substantially lower compared to flowrates allowed a radial hole or another channel, such as a flowrate of 2.1 L/min. If 0.2 L/min are injected as a flow in the axial passage, the first user may drain the flow completely and the second user may be starved of lubricant. Under a centrifugal field of force, a radial hole of 4 mm in diameter may drain fluid flow in the order of liters per minute (L/min). Assuming that the first user has a radial hole with a diameter of 4 mm, the first user may drain 2 L/min of fluid flow. It may be sufficient to feed 2.1 L/min or more of fluid flow to supply the second user with lubricant. However, the pump may have to be sized to pump 2.1 L/min instead of 0.2 L/min. Additionally, at least 1.9 L/min are lost via the first user resulting in fluid splashing around the transmission and power losses for the 1.9 L/min of lubricant. To avoid the power losses, the radial hole of the first user and second user may be machined as different diameters. For example, the radial hole of the first user may be machined to be 1.6 mm in diameter. Under the same centrifugal field, the first user may drain 0.6 L/min, and the pump may deliver 0.7 L/min instead of 0.2 L/min. The pump oversizing is somewhat reduced and 0.5 L/min of fluid flow are contributing to the splashing power loss. The diameter of an orifice, such as the radial holes of the first or the second user, may not be made smaller at will for technologic limit of the machining process and may increase clogging of the radial hole for the first user compared to a larger hole.

To prevent power losses and oversizing without varying sizing and dimensions the fluid channels fluidly coupled to the fluid passage, a shaft of the present disclosure may be used in as a part of the forced lubrication system. The shaft of the present disclosure may contain an axial passage that is a fluid passage, such as a fluid line. The axial passage is offset from the central axis and rotational axis of the shaft. The axial passage is centered on another axis that is parallel and non-coaxial to the central and rotational axis of the shaft. The shaft includes at least two axially spaced apart radial channels fluidly communicating with the fluid passage and inclined at different angles with respect to a plane that cross-sections the shaft in a longitudinal direction with respect to the axis of rotation. The plane contains the central and rotational axis of the shaft and contains the another axis the axial passage is centered on. The angles of the two axially spaced apart radial channels may prevent a maximum flowrate fluid, such as lubricant, specific to the diameter and cross sectional area of each radial channel from draining via the radial channels. A fluid in the axial passage may have a fluid surface that is equidistant from the central and rotational axis of the shaft. Offsetting the axial passage from the central and rotational axis, may have the fluid surface curve to follow a circular curve shape. The circular curved shape of the fluid surface follows perimeter of a circle or cylinder radially around the central axis. The shape of the fluid surface and the angling of each of the two axially spaced apart radial channels may prevent a maximum fluid volume flowing through each of the two axially spaced apart radial channels. A first radial channel at a first angle may receive fluid from the axial passage, until a height of the fluid surface falls below a first opening to the first radial channel. Likewise, the second radial channel at a second angle may receive fluid from the axial passage, until the height of fluid surface falls below a second opening to the second radial channel. The first angle may be greater than the second angle, such that the second radial channel may receive fluid that is at a lower height than the first radial channel. Each of two axially spaced apart radial channels may each be feed holes that may supply a consumer and may be part of a user. For example, the two axial spaced apart radial channels may be used in place of the radial holes of the example above, with a first radial channel being part of a first user and a second radial channel being part of a second user. Additionally or alternatively, there may be more than two axially spaced apart radial channels, where each of the axially spaced apart radial channels extends from the plane at a different angle. Where each angle for a radial channel is smaller than the angle of the last radial channel, where the radial channel is further in an axial direction from the inlet than the last radial channel. Additionally, or alternatively there may be one or more bleed holes that are axially spaced apart radial channels. The one or more bleed holes may include one or more of the two axially spaced apart radial channels.

Figure 2:
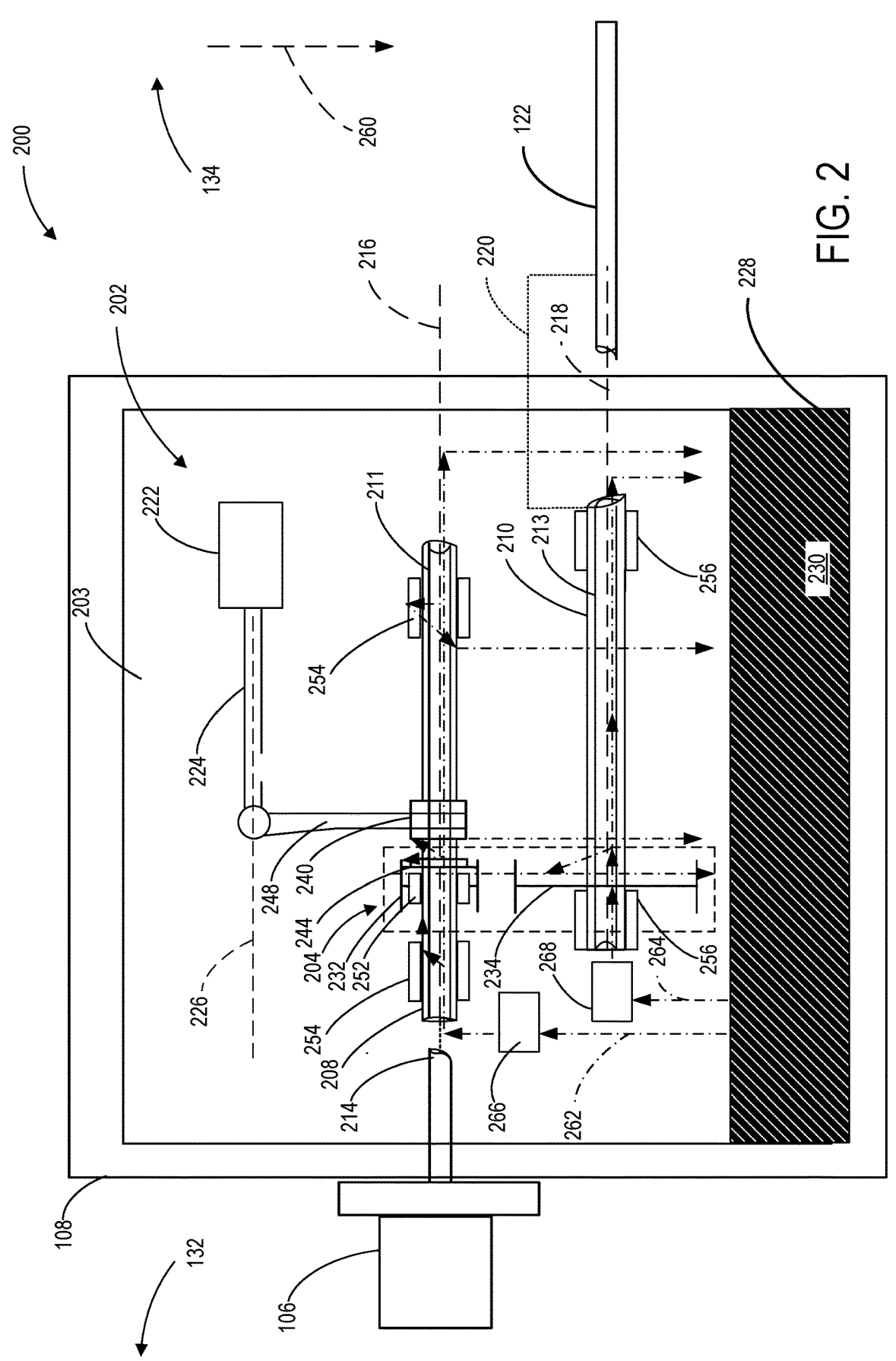
FIG. 2 shows an example schematic of a gear assembly of the transmission which includes shafts and the lubrication system of the present disclosure.
Figure 3:
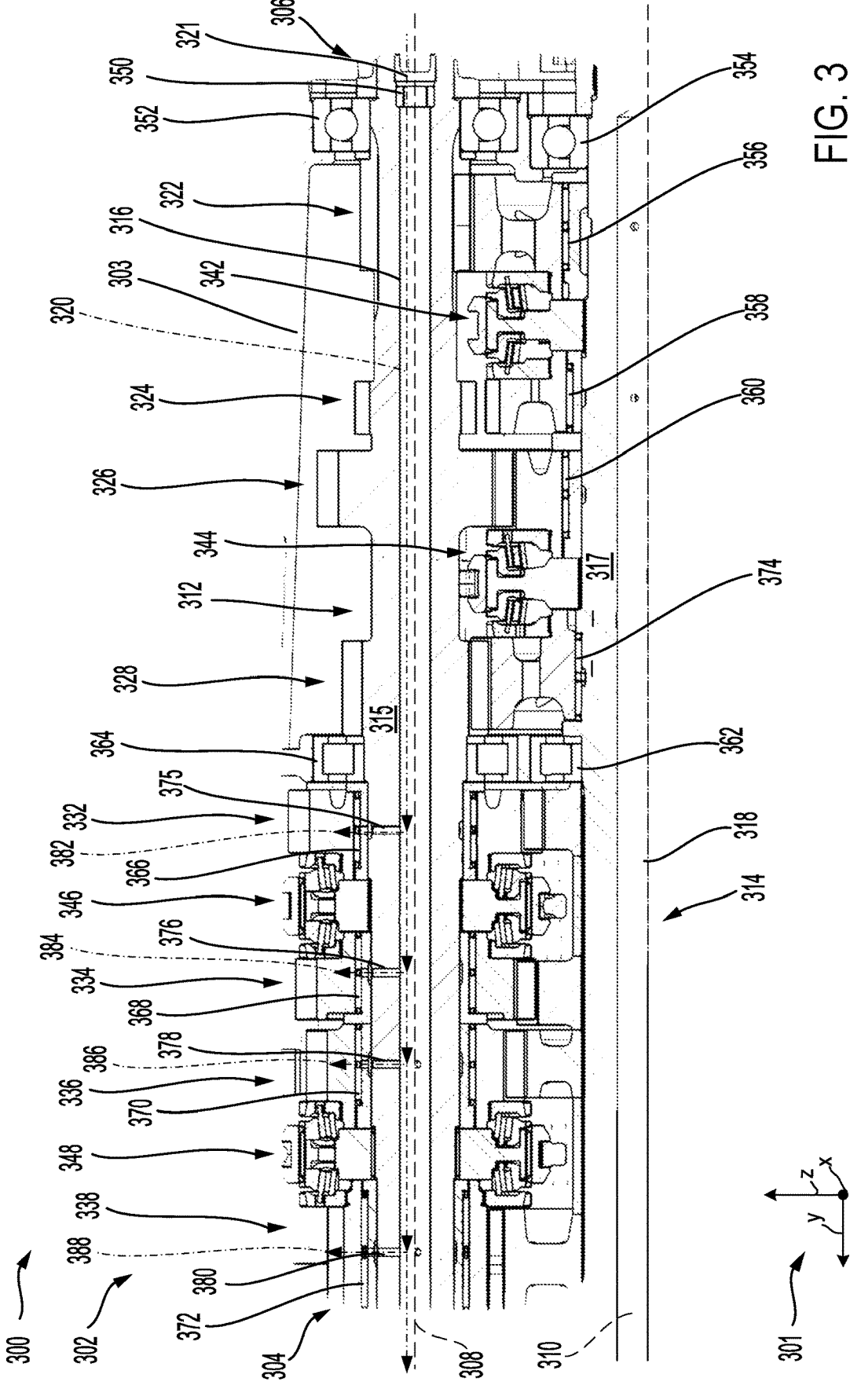
FIG. 3 shows a sectional view of an eight speed gearbox of the present disclosure.
Figure 4:
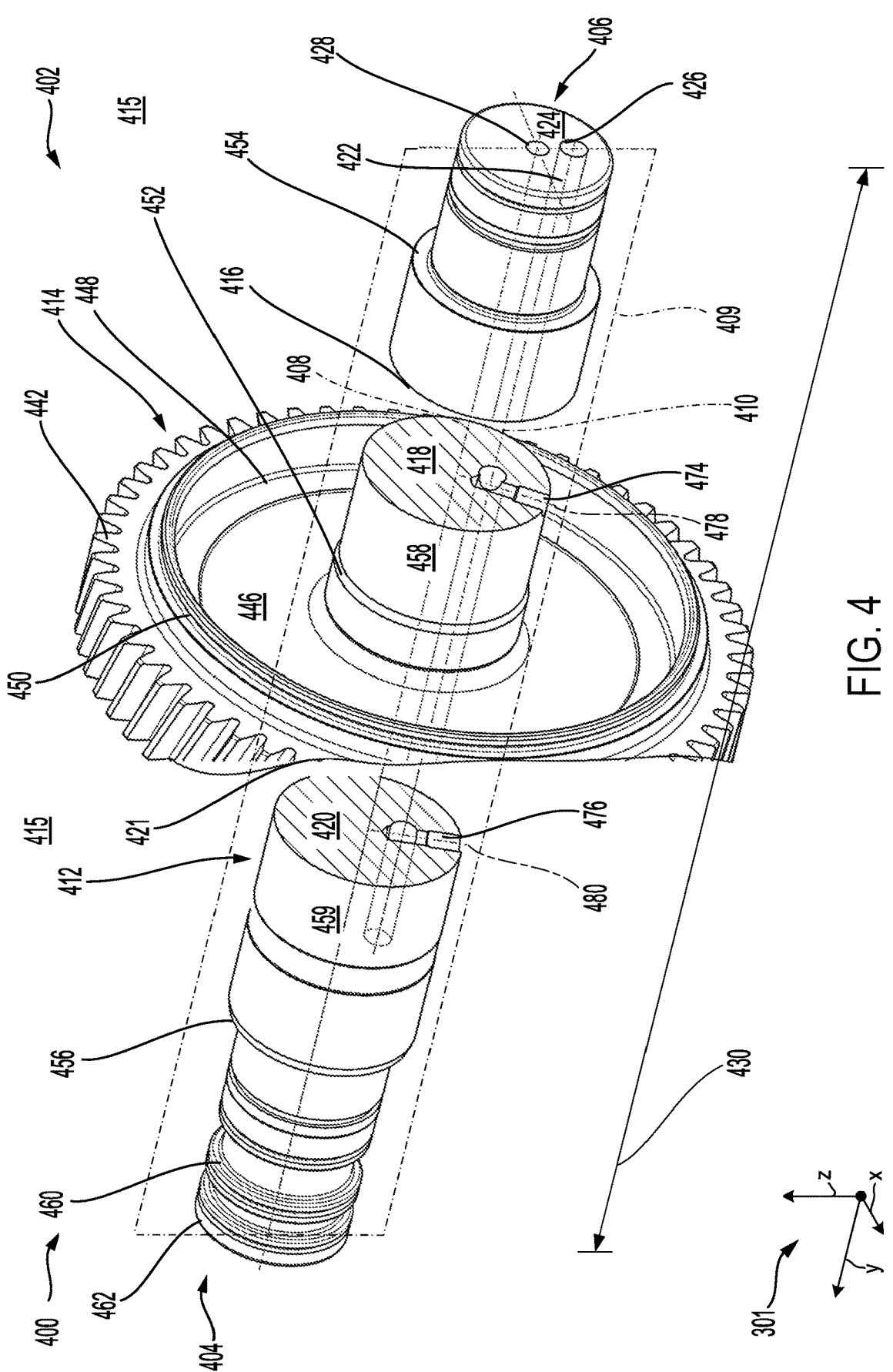
FIG. 4 shows a side view of a first shaft of the present disclosure that is partially sectioned and exploded.

FIG. 1 shows an example schematic of a vehicle which may include the transmission of the present disclosure. The vehicle in FIG. 1 may be an electrified vehicle such as an EV or a hybrid vehicle with multiple sources of torque that may include an electric motor, a hydrogen fuel cell, and/or a non-internal combustion (ICE) engine. FIG. 1 shows an example schematic of a vehicle which may include the transmission of the present disclosure. FIG. 2 shows an example schematic of a gear assembly of the transmission which includes shafts and the lubrication system of the present disclosure. FIG. 3 shows a sectional view of an eight speed gearbox of the present disclosure. The eight speed gearbox of FIG. 3 is of a two shaft scheme, with two shafts that may be selectively coupled via one or more of the clutches shown. FIG. 4 shows a side view of a first shaft of the present disclosure that is partially sectioned and exploded. The first shaft of FIG. 4 be used in place of either of the two shafts of FIG. 3.

Figures 5, 6:
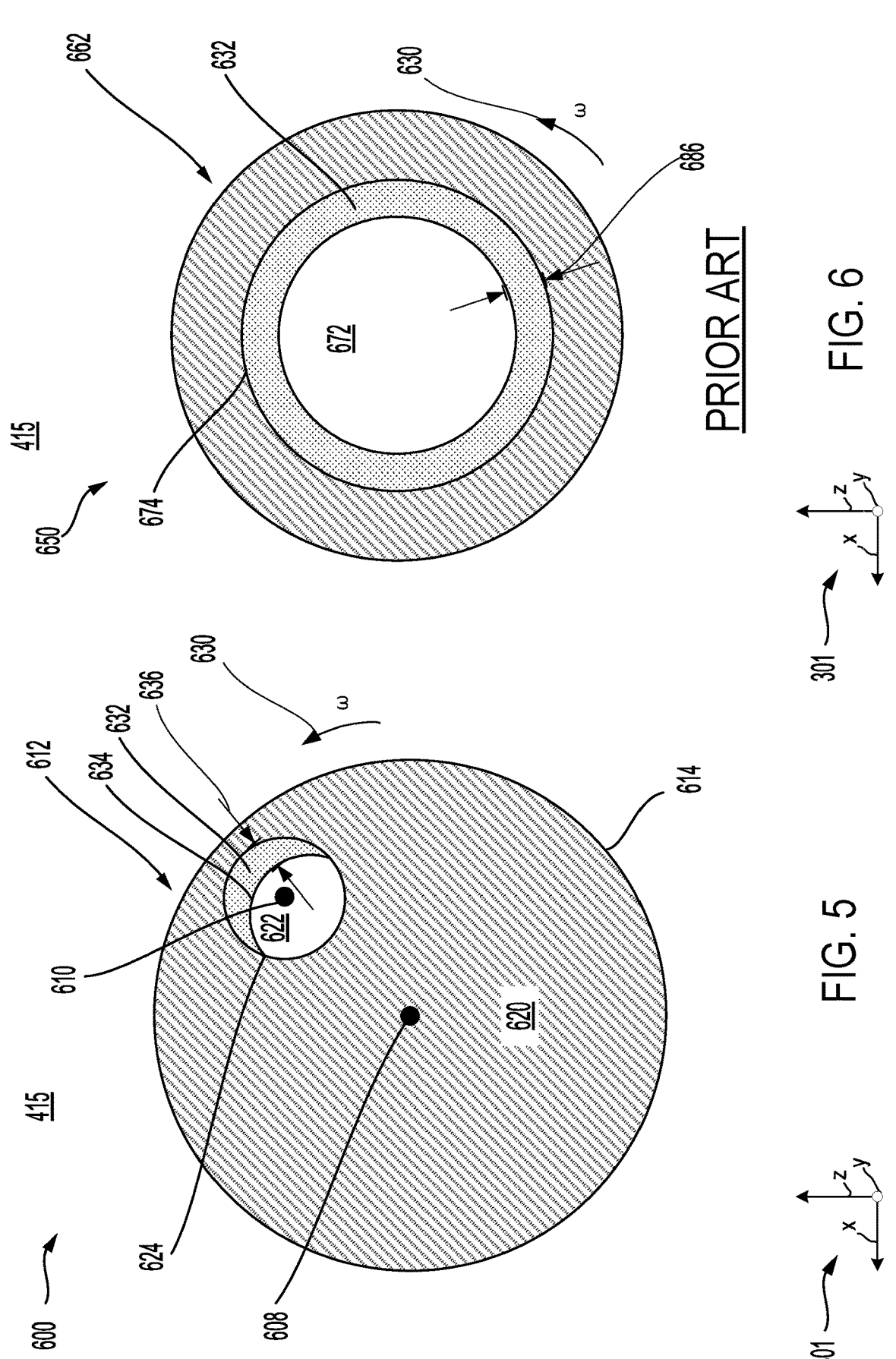
FIG. 5 shows a sectional view and an example schematic of a shaft and a complementary axial passage of the present disclosure.
FIG. 6 shows a sectional view and an example schematic of a shaft and a complementary axial passage of prior art.
Figure 7:
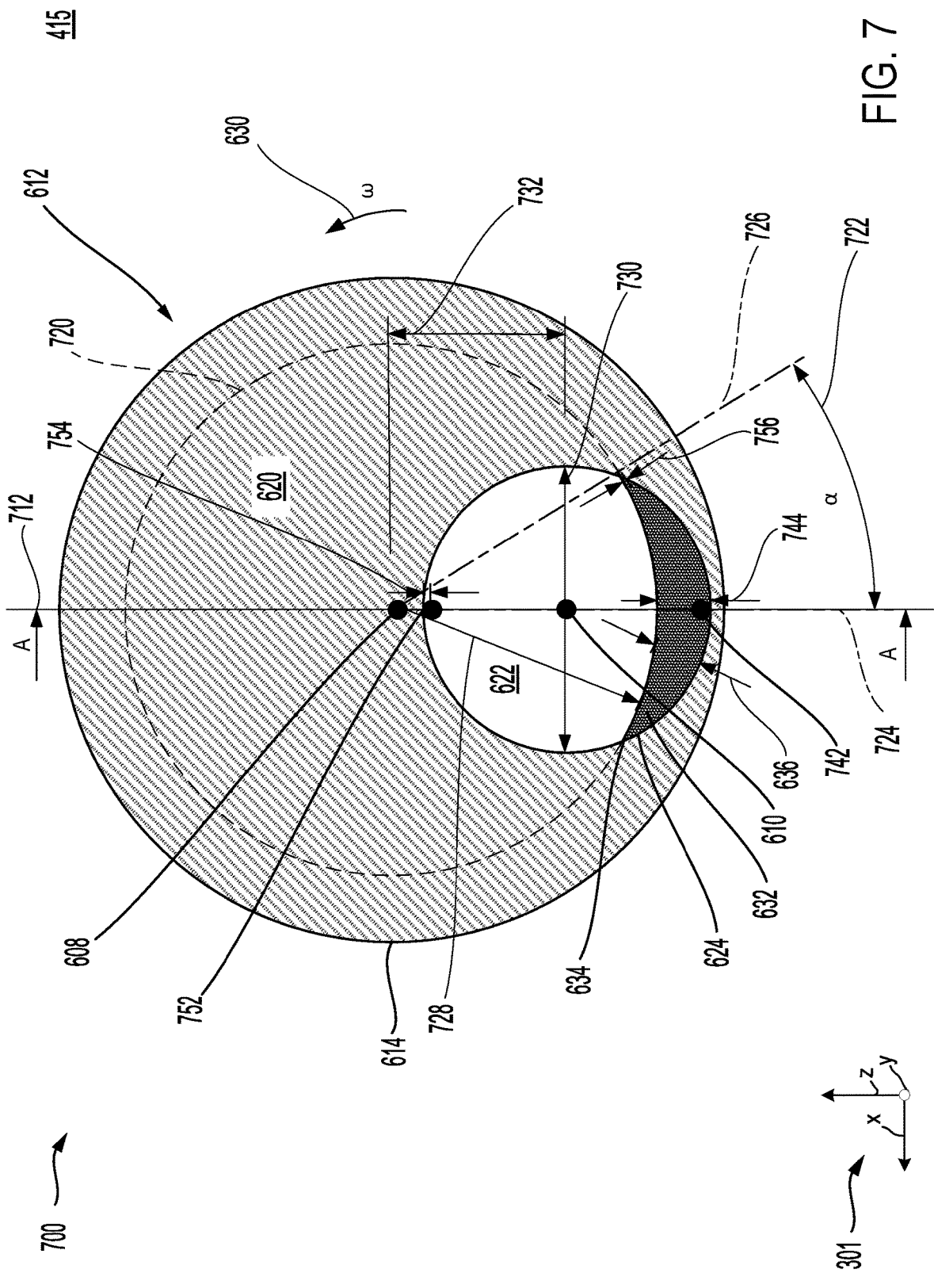
FIG. 7 shows a sectional view of the example schematic of the present disclosure with the angles of specific features.
Figure 8:
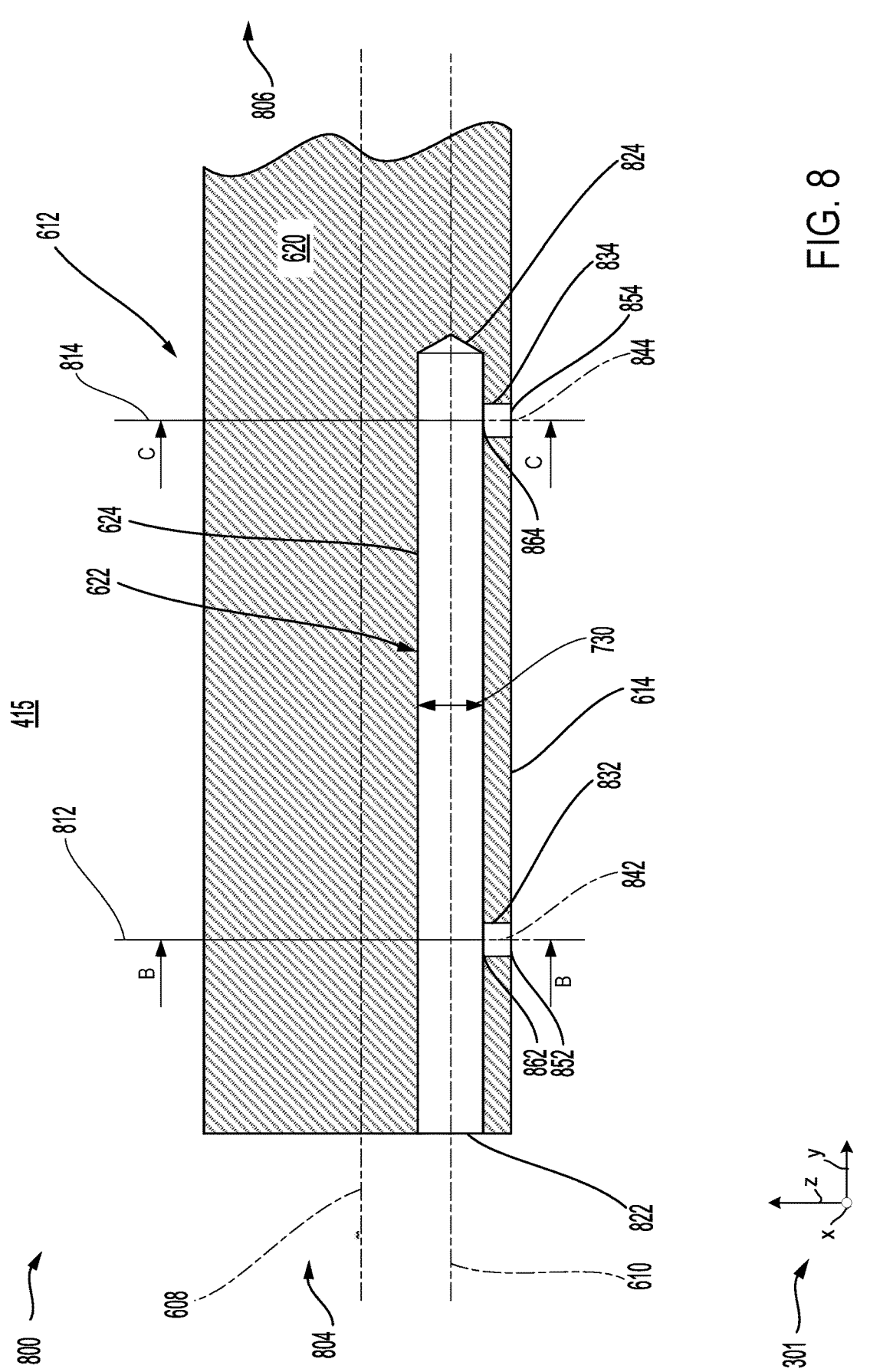
FIG. 8 shows a sectional view of an example schematic of a shaft, an axial passage, and fluid channels of the present disclosure.
Figure 9:
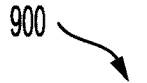
FIG. 9 shows a sectional view of the shaft with an angle of the fluid channels relative to the axial passage.
Figure 9:
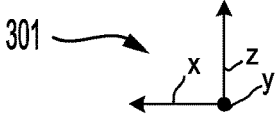
Figure 10:
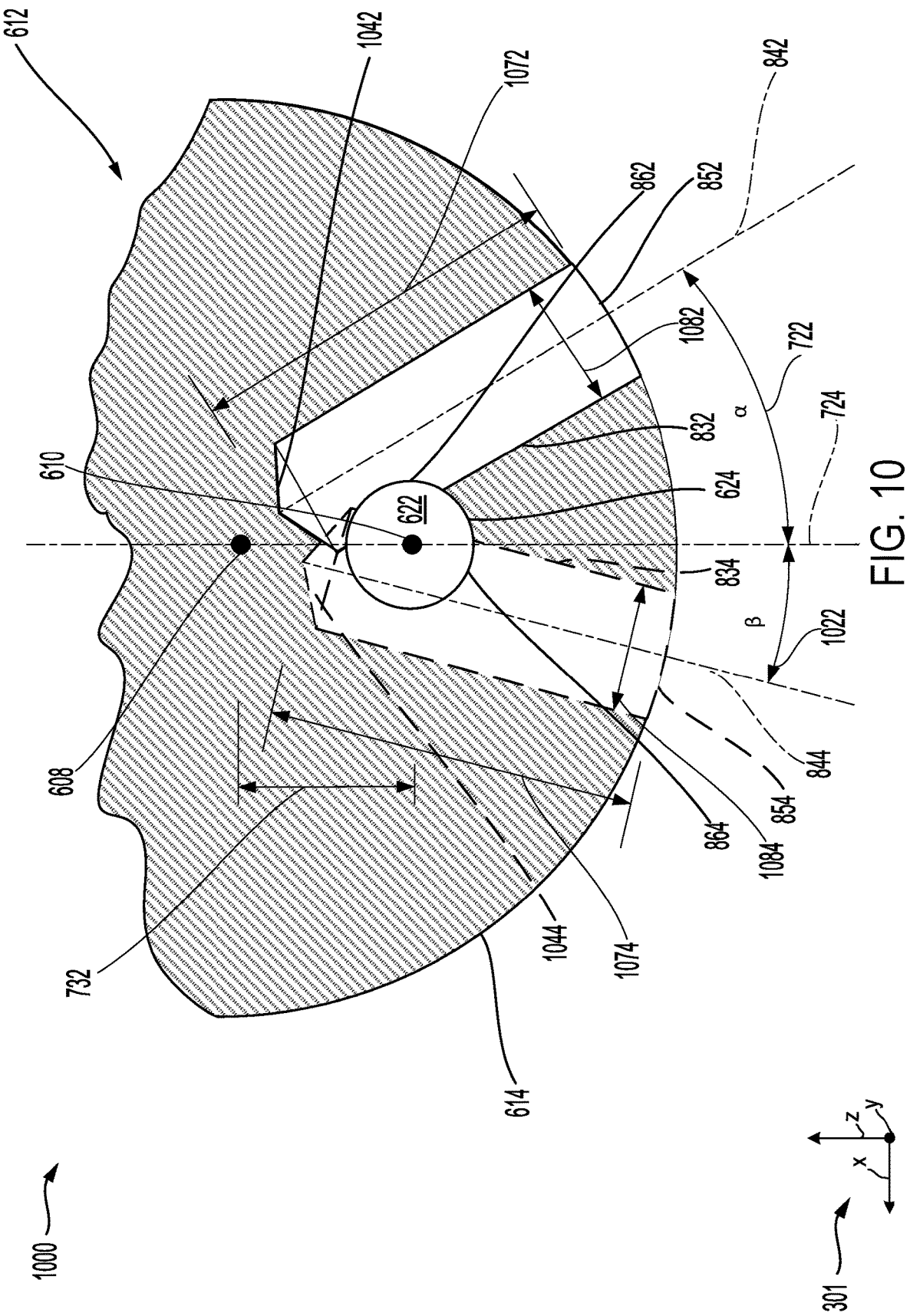
FIG. 10 shows a composite sectional view of the fluid channels and their respective angles superimposed on the shaft.

FIG. 5 shows a sectional view and an example schematic of a shaft and a complementary axial passage of the present disclosure. FIG. 6 shows a sectional view and an example schematic of a shaft and a complementary axial passage of prior art. The surface of the fluid shown in FIG. 5 may have a circular arc with varying height from the surface of the axial passage compared to the fluid surface of FIG. 6. The fluid surface of FIG. 6 has a ring shape and be at an approximately constant height from a surface of a center passage. FIG. 7 shows a sectional view of the example schematic of the present disclosure with the angles of specific features. FIG. 8 shows a sectional view of an example schematic of a shaft, an axial passage, and fluid channels of the present disclosure. FIG. 9 shows a sectional view of the shaft with an angle of the fluid channels relative to the axial passage. FIG. 10 shows a composite sectional view of the fluid channels and their respective angles superimposed on the shaft. The schematic of the shaft of FIGS. 7-10 may be schematic configurations of the shaft of FIG. 4.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIGS. 1-2 and FIGS. 5-10 shows schematics of an example configuration with relative positioning of the various components. FIGS. 3-4 show example configurations with approximate position. FIGS. 3-4 are shown approximately to scale; though other relative dimensions may be used. As used herein, the terms "approximately" is construed to mean plus or minus five percent of the range unless otherwise specified. As used herein, the terms "substantially" is construed to mean greater or less than by a factor of two when comparing a component/feature to one or more other components/features.

Further, FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to a longitudinal axis and a vertical axis. Features described as lateral may be approximately parallel with the lateral axis. A vertical axis may be normal to a lateral axis and a longitudinal axis. Features described as vertical may be approximately parallel with a vertical axis.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The powertrain 101 comprises a prime mover 106 and a transmission 108. The prime mover 106 may be an internal combustion engine (ICE) or an electric motor, for example, and is operated to provide rotary power to the transmission 108. The transmission 108 may be any type of transmission, such as a manual transmission, an automatic transmission, or a continuously variable transmission. Additionally, the transmission 108 may be a gearbox, an axle, or a trans axle. The transmission may be a forced lubrication transmission part of a forced lubrication transmission system, where lubricant may be pumped at a pressure for lubrication, and may apply lubricant, such as via a spray, a mist, or a drop. The transmission 108 receives the rotary power produced by the prime mover 106 as an input and outputs rotary power to the drivetrain 103 in accordance with a selected gear or setting. Additionally, there may be other movers in the vehicle besides prime mover 106. If the prime mover 106 is an ICE there may be at least a second mover with an input to the transmission 108, wherein the second mover may be an electric machine such as an electric motor. In one example, if there are a single or plurality of second movers in addition to the prime mover 106, the vehicle 100 may be a hybrid vehicle, wherein there are multiple torque inputs to the transmission 108. The vehicle 100 may have a longitudinal axis 130. The powertrain 101 and drivetrain 103 may have a length parallel with the longitudinal axis 130.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a light, medium, or heavy duty vehicle. The vehicle 100 may be an on-highway vehicle, a passenger vehicle, including a passenger car, a commercial vehicle that is an on-highway vehicle, a semi-trailer truck, and/or a sports utility vehicle. The vehicle may be an off-highway vehicle or a vehicle with on-highway and off-highway capabilities, such as a construction vehicle, an agricultural vehicle, a sports utility vehicle, and/or a commercial vehicle that is an off-highway vehicle. For an example embodiment, the vehicle 100 may be a wheeled vehicle, such as an automobile. Additionally or alternatively, the vehicle 100 and/or one or more of its components, such as components of the powertrain 101 and/or drivetrain 103, may be used in industrial, locomotive, military, agricultural, and/or aerospace applications. Additionally or alternatively, the vehicle 100 may be a plane, a boat, or other vehicle system that utilizes lubricant. In one example, the vehicle 100 is an all-electric vehicle or a vehicle with all-electric modes of operation, such as a plug-in hybrid vehicle. As such, the prime mover 106 may be an electric machine. In one example, the prime mover 106 may be an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. The first driveshaft 113 and second driveshaft 122 may be positioned to extend in parallel with the longitudinal axis 130. For an example of a configuration of vehicle 100, the second driveshaft 122 may be centered about the longitudinal axis 130.

The first differential 116 may supply a FWD in some capacity to vehicle 100, as part of rotary power transferred via the first driveshaft 113. Likewise, the second differential 126 may supply a RWD to vehicle 100, as part of the rotary power transferred via the second driveshaft 122. The first differential 116 and the second differential 126 may supply a FWD and RWD, respectively, as part of an AWD mode for vehicle 100.

Adjustment of the drivetrain 103 between the various modes as well as control of operations within each mode may be executed based on a vehicle control system 154, including a controller 156. Controller 156 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 156 may be a powertrain control module (PCM).

Controller 156 may receive various signals from sensors 158 coupled to various regions of vehicle 100. For example, the sensors 158 may include sensors at the prime mover 106 or another mover to measure mover speed and mover temperature, a pedal position sensor to detect a depression of an operator-actuated pedal, such as an accelerator pedal or a brake pedal, a lever position sensor to detect a shifting of a lever, such as a brake lever, speed sensors at the first and second set of wheels 104, 114, etc. Upon receiving the signals from the various sensors 158 of FIG. 1, controller 156 processes the received signals, and employs various actuators 160 of vehicle 100 to adjust drivetrain operations based on the received signals and instructions stored on the memory of controller 156. For example, controller 156 may receive an indication of depression of the brake pedal, signaling a desire for decreased vehicle speed. Vehicle braking may be directly proportional to accelerator pedal position, for example, degree of depression. For another example, controller 156 may receive an indication of depression of the accelerator pedal, signaling a desire for increased vehicle speed. Vehicle acceleration may be directly proportional to accelerator pedal position, for example, degree of depression. In response, the controller 156 may command operations, such as shifting gear modes of the transmission 108. Alternatively, the gear modes of the transmission 108 may be shifted manually, such as if the transmission 108 is a manual transmission.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, further comprising a second transmission arranged on the second set of axle shafts 128. The transmission 108 may be a gearbox. Alternatively, the transmission 108 may be an axle transmission or a trans axle transmission.

Turning to FIG. 2, a schematic 200 of the transmission 108 illustrated with reference to FIG. 1 is shown. The transmission 108 includes a volume that may be referred to as a gear enclosure 203. In an example of a configuration, the gear enclosure 203 may house a gear assembly 202. The gear enclosure 203 may house or house portions of a plurality of shafts that support rotational elements of the gear assembly 202. The transmission 108 may be a multi-stage reduction gearbox where the gear assembly 202 acts as a system of a plurality of reduction sets. Alternatively, the transmission 108 may be another form of multi-stage transmission, such as a multi-stage axle or a multi-stage transaxle transmission, where the gear assembly acts as a system of a plurality of reduction sets. The gear assembly 202 may be formed of at least two reduction sets that may reduce the rotational speed (e.g., rotation per minute (RPM)) and increase the torque. The reduction sets may be referred to herein as stages. The stages may be gearsets. However, the stages may also be another form of reduction set or other power transfer set, such as a belt and pulley set. There may be at least a first stage 204. The first stage 204 may include gears, such as fixed gears. It is also to be appreciated that the gear assembly 202 may be used for another gear system that is not a transmission, such as in a gearbox that is not a transmission.

As an example, the enclosure 203 of gear assembly 202 may include at least two shafts. The two shafts include a first shaft 208 and a second shaft 210. The first stage 204 may be supported by the first shaft 208 and the second shaft 210. The first shaft 208 may be an input to the first stage 204. The second shaft 210 may be an output for the first stage 204. The first stage 204 may drivingly couple the first shaft 208 to the second shaft 210. The first shaft 208 may be centered on a first axis 216. The second shaft 210 may be centered on a second axis 218. The first axis 216 and second axis 218 may be parallel with one another. The first stage 204 may traverse the first axis 216 to the second axis 218.

The first and second shafts 208, 210 may be hollow. The first shaft 208 may include at least a first passage 211. The second shaft 210 may include at least a second passage 213. The first passage 211 may have a length parallel with the first axis 216 when the first shaft 208 is parallel with and/or centered around the first axis 216. The second passage 213 may have a length parallel with the second axis 218 when the second shaft 210 is parallel with and/or centered around the second axis 218. The first and second axes 216, 218 may be horizontal, and perpendicular to a vertical axis and the direction of gravity. A plurality of additional passages, channels, and openings of the first shaft 208 may fluidly couple the first passage 211. A plurality of additional passages, channels, and openings of the second shaft 210 may fluidly couple the second passage 213.

The first shaft 208 may drivingly couple a first input shaft to gear assembly 202. The first input shaft is an input that transmits rotational energy to the gear assembly 202. The first input shaft may also be a first input to the transmission 108. For example, the first input shaft to the gear assembly 202 may be an output shaft 214 of the prime mover 106. The output shaft 214 may be referred to herein as the prime mover output shaft 214. For this example, the prime mover 106 may be a first electric machine. Shafts and other components that are drivingly coupled and not directly contacting are represented by dotted lines 220.

However, other configurations of the gearbox are possible. For example, the first input shaft may be a shaft drivingly coupled to output shaft 214 or the output of another reduction set. Additionally, for other configurations, there may be additional stages that may selectively and drivingly couple the first shaft 208 to the second shaft 210. For example, there may be a second stage separate from the first stage 204 that may drivingly and selectively couple the first shaft 208 to the second shaft 210. The second stage may be of a different ratio and effective diameter from the first stage 204. For this or other examples, there may be a third stage separate from the second stage and the first stage 204 that may drivingly and selectively couple the first shaft 208 to the second shaft 210. The third stage may be of a different ratio and effective diameter from the second stage and the first stage 204. For these or other examples, there may be a fourth stage separate from the third stage, the second stage and the first stage 204 that may drivingly and selectively couple the first shaft 208 to the second shaft 210. The fourth stage may be of a different ratio and effective diameter from the third stage, the second stage, and the first stage 204. For these or other examples, there may be a n stage separate from an n−1 stage, the fourth stage, the third stage, the second stage and the first stage 204. The n stage may be of a different ratio and effective diameter from the n−1 stage, the fourth stage, the third stage, the second stage, and the first stage 204

The transmission 108 may be at least a one-speed configuration, where the transmission 108 outputs a rotational speed to an output shaft of the transmission. The second shaft 210 may be drivingly coupled to at least a first output shaft. For example, the first output shaft may be a drive shaft, such as the second driveshaft 122. Rotational energy from the first shaft 208 may be transferred to the second shaft 210 and an output shaft, such as the second driveshaft 122, when selectively and drivingly coupled via the first stage 204. When not selectively and drivingly coupled to the second shaft 210 via the first stage 204, the first shaft 208 may be driven and not output to another shaft. However, other configurations of the gear assembly 202 and enclosure 203 are possible. Alternatively, the first output shaft may be a shaft drivingly coupled to a drive shaft, such as the second driveshaft 122, or to another reduction set. For another example, the transmission 108 may be a two speed transmission enabling a second speed. For this example, the first shaft 208 and second shaft 210 may output to different output shafts, where first shaft 208 may output and drivingly couple to a second output shaft separate from the first output shaft, such as the first driveshaft 113 of FIG. 1. Additionally, for this or other examples, the first shaft 208 and/or second shaft 210 may be output shafts. Additionally, for this or other examples, the first shaft 208 and second shaft 210 may be drivingly and selectively coupled via an additional set or a plurality of additional sets from the first stage 204, such as a second stage. The additional set or plurality of additional sets may be of different ratios than the first stage 204, such that a different speed is output to the second shaft 210 and the first output shaft when the first shaft 208 is selectively and drivingly couple to the second shaft 210 via the second stage or another stage other than the first stage 204.

It is to be appreciated, that number of shafts, the number of sets, and the number of speeds output by the transmission 108 may be non-limiting. For other examples, the gear assembly 202 may include more than two shafts. For these examples, the additional shafts of the gear assembly 202 may be hollow as the first and second shafts 208, 210, where each shaft has a passage extending between opposite ends of the respective shaft like as the first and second passages 211, 213. Each additional shaft may be drivingly and selectively coupled to either the first shaft 208 or the second shaft 210. For other examples, the transmission 108 may have additional sets from the first stage 204, where the additional sets may drivingly and selectively couple the first shaft 208 to the second shaft 210, where each of the sets is of a different ratio enabling a different speed. For example, an alternative configuration of the gear assembly 202 may have two sets, such as gearsets, of different ratios that may drivingly and selectively couple the first shaft 208 to the second shaft 210. For example, an alternative configuration of the gear assembly 202 may have three sets of different ratios that may drivingly and selectively couple the first shaft 208 to the second shaft 210. For another example, an alternative configuration of the gear assembly 202 may have four sets of different ratios that may drivingly and selectively couple the first shaft 208 to the second shaft 210. For another example, an alternative configuration of the gear assembly 202 may have five sets of different ratios that may drivingly and selectively couple the first shaft 208 to the second shaft 210. For another example, an alternative configuration of the gear assembly 202 may have six sets of different ratios that may drivingly and selectively couple the first shaft 208 to the second shaft 210. For another example, an alternative configuration of the gear assembly 202 may have seven sets of different ratios that may drivingly and selectively couple the first shaft 208 to the second shaft 210. For another example, an alternative configuration of the gear assembly 202 may have eight sets of different ratios that may drivingly and selectively couple the first shaft 208 to the second shaft 210. In such examples, each of the aforementioned configurations may provide n number of selectable speeds based on the number of sets of gear ratios of the transmission.

For other examples, alternate configurations of transmission 108 and gear assembly 202 with more than two shafts and/or additional stages, may enable greater than two speeds to the output. For example, in an alternate configuration, the transmission 108 may be an eight speed transmission and the assembly 202 may be an eight speed assembly enabling eight speeds, such as the assembly 302 in FIG. 3. For another example, the transmission 108 and the gear assembly 202 may enable three speeds. For another example, in an alternative configuration the transmission 108 and the gear assembly 202 may enable four speeds. For another example, in an alternative configuration the transmission 108 and the gear assembly 202 may enable five speeds. For another example, in an alternative configuration transmission 108 and the gear assembly 202 may enable six speeds. For another example, in an alternative configuration the transmission 108 and the gear assembly 202 may enable seven speeds. For another example, in an alternative configuration the transmission 108 and the gear assembly 202 may enable nine speeds. For another example, in an alternative configuration transmission 108 and the gear assembly 202 may enable n speeds.

An actuator 222 may selectively and drivingly couple the first stage 204 to the first shaft 208. The actuator 222 may be shiftingly coupled to a shifting rod 224, where the actuator 222 may shift the shifting rod 224 in a direction. The actuator 222 may be mounted to the transmission 108 or a component of the transmission 108, such as the walls and surfaces of the enclosure 203. For one example, the actuator may be mounted via fastening by a plurality of fasteners, such as screws. For another example, the actuator may be fit to a recess or void of surfaces and material of the transmission 108. The actuator 222 may be one of the actuators 160 of FIG. 1.

The actuator 222 may translate the shifting rod 224 along third axis 226. When translated in a first direction, such as toward the front end 132, the shifting rod 224 may drivingly couple the first stage 204 to the first shaft 208. When translated in a second direction, such as toward the rear end 134, the shifting rod may decouple the first stage 204 from the first shaft 208. The shifting rod 224 may be guided by the housing of the transmission 108 and/or enclosure 203. For other examples, the shifting rod 224 and may drivingly couple another stage (e.g., a set/gearset) to the first shaft 208, where the another stage is a different from the first stage 204. For these examples, if the shifting rod 224 is shifted in another direction than the first direction, such as further distance in the second direction.

The enclosure 203 may include a sump 228 collecting a work fluid 230. The work fluid 230 may be a lubricant, such as oil. The sump 228 may be located below the gear assembly 202, such that work fluid 230 may be returned to the sump 228 via the force of gravity 260. After lubricating the gears of the first stage 204, work fluid 230 may be returned to the sump 228 via splashing and dripping.

The first stage 204 may include at least a first gear 232 and a second gear 234. The first gear 232 may be rotationally coupled to the first shaft 208, and the second gear 234 may be rotationally coupled to the second shaft 210. When rotationally coupled to a shaft, the first gear 232 and second gear 234 may rotate with their respective shafts. At least one of the first gear 232 or the second gear 234 may be physically coupled to the first shaft 208 or second shaft 210, respectively. At least one of the first gear 232 or the second gear 234 may be supported by bearings, races, and/or bushings, such that the first gear 232 and/or the second gear 234 may rotate freely of the first shaft 208 or the second shaft 210, respectively. For example, the first gear 232 may be supported by at least a first bearing 252. The first bearing 252 may be positioned radially between the first gear 232 and the first shaft 208, such that the first bearing 252 may rotate freely of the first shaft 208. The first gear 232 may be selectively and rotationally coupled to the first shaft 208 via selective coupling of a first engaging component 240 and a first engagement component 244. The first gear 232 may rotate freely about the first shaft 208 when the first engaging component 240 and the first engagement component 244 are not selectively coupled.

The first shaft 208 may be supported by a plurality of second bearings 254, and the second shaft 210 may be supported by a plurality of third bearings 256. The second bearings 254 and third bearings 256 may be positioned radially about the first and second shafts 208, 210, respectively. The second bearings 254 may be positioned at opposite ends of the first shaft 208. Likewise, the third bearings 256 may be positioned about the second shaft 210 at opposite ends of the second shaft 210.

There may be at least one arm and an engagement drivingly coupled to the shifting rod 224 to select reduction sets. The number of arms and engagements drivingly coupled to the shifting rod 224 may be dependent on the number of sets to engage. The first stage 204 may drivingly couple to the first shaft 208 via a first engaging component 240 and first engagement component 244. The first engaging component 240 may shiftingly couple to the shifting rod 224 via a first arm 248. The shifting rod 224 may shift the first engaging component 240 to engage and lock with the first engagement component 244. The first engagement component 244 may drivingly couple to the first gear 232. The first engaging component 240 and first engagement component 244 may form a clutch, such as a synchronizer clutch or a dog clutch. As components of a clutch—the first engaging component 240 may be a shift sleeve-such as a shift collar. The first engaging component 240 may be a synchronizer if the first engaging component 240 and the first engagement component 244 are part of a synchronizer clutch. The first engaging component 240 may be a dog collar if the first engaging component 240 and the first engagement component 244 are part of a dog clutch.

Schematic 200 shows a first flow path 262 that the work fluid 230 may take from the sump 228. The flow of work fluid 230 on the first flow path 262 may be driven via suction from a first pump 266. Likewise, schematic 200 shows a second flow path 264 the work fluid 230 may take from the sump 228. The flow of work fluid 230 on the second flow path 264 may be driven from suction from a second pump 268. Both the first flow path 262 and second flow path 264 are driven to at least the first and second shafts 208, 210, respectively, via a forced lubrication system.

For an example, components of the transmission 108 and the gear assembly 202 may be lubricated in a method via the first flow path 262. The first flow path 262 may begin at the sump 228. Work fluid 230 may be drawn to the first pump 266. The first pump 266 may increase the pressure of and direct the work fluid 230 to the first shaft 208. A pressure gradient created via the first pump 266 may drive work fluid 230 to the first shaft 208. The first shaft 208 may receive the work fluid 230 via an inlet to the first passage 211. Work fluid 230 on the first flow path 262 may travel through the first passage 211. Work fluid 230 on the first flow path 262 may travel to other fluid passages, openings, and other hollow volumes of the first shaft 208 in fluid communication with the first passage 211. It is to be appreciated that while in the first shaft 208, work fluid 230 on the first flow path 262 may not be driven by a pressure differential or through other means of forced lubrication. While in the first passage 211 and other volumes of the first shaft 208, work fluid may be driven under open channel flow. Work fluid on the first flow path 262 in the first shaft 208 may have a fluid free surface and be driven under the action of applied force, such as forces from the rotation of the first shaft 208. The rotation of the first shaft 208 may drive work fluid outward in a radial direction from the first passage 211 and the first shaft 208 via a plurality of channels and openings. Lubricant driven radially outward from the first shaft 208 may lubricate the components positioned about the first shaft 208, such as the first gear 232, the first engagement component 244, and the first engaging component 240. Lubricant on the first flow path 262 may also be driven to lubricate other components of the first stage 204. For example, lubricant on the first flow path 262 may be carried by the first gear 232 to lubricate the second gear 234 and the mesh between the first gear 232 and second gear 234. Work fluid on the first flow path 262 may be returned to the sump 228, after lubricating components positioned around the first shaft 208 or part of the first stage 204. Work fluid 230 on the first flow path 262 may also exit the first passage 211 via an outlet and return to the sump 228.

Components of the transmission 108 and the gear assembly 202 may be lubricated in a second method via the second flow path 264. In one example, the second method may be similar to the first method, however lubricant is driven to and distributed to other components of the gear assembly 202 via the second shaft 210. For example, the second flow path 264 may begin at the sump 228. Work fluid 230 may be drawn to the second pump 268 and directed to the second shaft 210. Rotation of the second shaft 210 may drive work fluid outward in a radial direction from the second passage 213 and the first shaft 208 via a plurality of channels to lubricate components positioned about the second shaft 210. Work fluid on the second flow path 264 may be returned to the sump 228 after lubricating components positioned around the second shaft 210 and may also exit the second passage 213 via an outlet.

It is to be appreciated that the arrangement of the first flow path 262 and second flow path 264 may be non-limiting. For example, the first flow path 262 may be spread by additional channels and openings of the first shaft 208. The additional channels and openings may extend radially from and fluidly couple to the first passage 211. For example, the additional channels and openings may lubricate additional components of transmission sets, such as additional gear sets. Likewise, the additional channels and openings may lubricate additional components of clutches for selectively coupling the first shaft 208 to additional stages. The additional channels and openings may lubricate additional engaging and engagement components separate from the first engaging component 240 and first engagement component 244. The first flow path 262 and additional channels and openings of the first shaft 208 may also direct lubricant to lubricate other supporting elements such as additional bearings, races, and bushings. Similarly, the second flow path 264 may be spread by additional channels and openings of the second shaft 210. The additional channels and openings may extend radially from and fluidly couple to the second passage 213, directing lubricant to other elements such as additional gears, bearings, races, and bushings.

Likewise, the additional channels and openings may lubricate additional components of clutches for selectively coupling the first shaft 208 to additional stages. The additional channels and openings may lubricate additional engaging and engagement components separate from the first engaging component 240 and first engagement component 244.

Likewise, the additional channels and openings may lubricate additional components of clutches, such as additional engaging and engagement components separate from the first engaging component 240 and first engagement component 244.

For an alternate example, the first and second flow paths 262, 264, may be driven by a common pump. For this example, the first pump 266 may supply fluid for the first and second flow paths 262, 264, and the second pump 268 may not be included by the transmission 108.

Schematic 200 shows a single shifting rod, shifting rod 224, that may be shifted by the actuator 222. The shifting rod 224 may physically couple to and actuate the first arm 248. However, it is to be appreciated that the schematic 200 is non-limiting and there may be a plurality of shifting rods and actuators. For example, there may be a plurality of shifting rods shifted by actuator 222. For another example, there may be a plurality of shifting rods wherein each shifting rod is shifted by an actuator specifically coupled to each shifting rod. For these examples, each shifting rod may be specific to an arm, such as the first arm 248 that may be used to actuate engagements, such as the first engaging component 240.

A set of reference axes 301 are provided for comparison between views shown in FIGS. 3-10. The reference axes 301 indicate a y-axis, an x-axis, and a z-axis. In one example, the z-axis may be parallel with a direction of gravity, and the x-y plane may be parallel with a horizontal plane that an assembly 302 may rest upon. In another example, the x-y plane may be parallel with a horizontal plane that an assembly 402 and a shaft 412 may rest upon. In another example, the x-y plane may be parallel with a horizontal plane that a first shaft 612 may rest upon. In another example, the x-y plane may be parallel with a horizontal plane that a second shaft 662 may rest upon. When referencing direction, positive may refer to in the direction of the arrow of the y-axis, x-axis, and z-axis and negative may refer to in the opposite direction of the arrow of the y-axis, x-axis, and z-axis. A circle may represent an axis of the reference axes 301 that is normal to a view. A circle may represent an axis of the reference axes 301 that is normal to a view. A filled circle may represent an arrow and axis facing toward, or positive to, a view. An unfilled circle may represent an arrow and an axis facing away, or negative to, a view.

Turning to FIG. 3, it shows a first view 300 of the assembly 302. The first view 300 is a sectional view of the assembly 302, where the first view 300 may be taken on a plane parallel with a plane formed by the y-z axis. The assembly 302 has a first side 304 and a second side 306, where the first side 304 is opposite to the second side 306.

The assembly 302 comprises a housing 303. The assembly 302 may include a plurality of shafts, such as at least two shafts. The housing 303 may house a plurality of rotational elements including shafts and gears of the assembly 302. The at least two shafts include a first shaft 312 and a second shaft 314. The assembly 302 is a transmission and/or a gearbox that may enable and output multiple speeds from the same input speed. The assembly 302 is an eight speed assembly, wherein the two shaft scheme may enable at least eight speeds to be output via the assembly.

The first shaft 312 may have a first passage 316, and the second shaft 314 may have a second passage 318. The first passage 316 may extend through a first material 315 of the first shaft 312. The second passage 318 may extend through a second material 317 of the second shaft 314. The first passage 316 and second passage 318 may be machined from their respective materials and shafts. For example, the first passage 316 and second passage 318 may be bored, such as gun drill bored, through the first material 315 and the second material 317, respectively. The first passage 316 may be a blind passage, such as a blind hole. The first passage 316 may extend from an opening at a first end and in the direction of a second end of the first shaft 312. The first end of the first shaft 312 may be opposite the second end of the first shaft 312. Likewise, the second passage 318 may be a blind hole. The second passage 318 may extend from an opening at a first end to and in the direction of a second end of the second shaft 314. The first end of the second shaft 314 may be opposite the second end of the second shaft 314. The first passage 316 and second passage 318 may be fluid passages, such as lubrication lines (e.g., lube lines), for their respective shafts. The first passage 316 and second passage 318 may have lengths extending parallel with the centerlines of the first shaft 312 and second shaft 314, respectively. The first passage 316 and second passage 318 may be central passages for the first shaft 312 and the second shaft 314, respectfully. As central passages, the first passage 316 and second passage 318 may be positioned approximately radially about and coaxial with the centerlines of the first shaft 312 and second shaft 314, respectively.

The first passage 316 may be parallel with the first axis 308 when the first shaft 312 is centered around the first axis 308. The first passage 316 may be coaxial with the first axis 308 when the first shaft 312 is centered around the first axis 308, such that the first passage 316 is positioned approximately radially around the first axis 308. The second passage 318 may be parallel with the second axis when the second shaft 314 is center around the second axis 310. Work fluid such as lubricant may be transported by the first passage 316 and second passage 318.

The first passage 316 may receive fluid via at least a first opening, such as a port 321. The port 321 may be positioned nearest to the second side 306 of the assembly 302. The port 321 may selectively allow lubricant and other fluids into the first passage 316. When engaged or opened, the port 321 may fluidly couple a supply of lubricant. When disengaged/closed, the port 321 may seal the first passage 316 from the supply of lubricant. Lubricant may enter first passage 316 via the port 321 from the second side 306. Lubricant may travel, such as via flowing, from the second side 306 to the first side 304 via a first flow path 320 upon entering the first passage 316. Fluid may travel on a flow path through the second shaft 314 via the second passage 318. Similar to the first passage 316, the second passage 318 may receive fluid via a second opening. For an example, the second flow path through the second passage 318 may be parallel and in the same direction as the first flow path 320, where the second flow path travels from the second side 306 to the first side 304. Alternatively, for another example, a second flow path through the second passage 318 may be parallel and in an opposite direction to the direction of the first flow path 320, where the second flow path travels from the first side 304 to the second side 306.

For an example, the first shaft 312 and/or second shaft 314 may be integrated into a forced lubrication system of assembly 302. As part of a method of lubricating the assembly 302, the forced lubrication system may transport lubricant to the openings of the first shaft 312 and/or second shaft 314 via a method of forced lubrication, such via pressure differentials, such as pressure differentials specific to the first shaft 312 and/or second shaft 314. Each pressure differential may be generated via a pump for a first example or from pressure head such as via the force of gravity. For example, lubricant may be transported to the port 321 via a pressure differential. Upon entering the first passage 316 or the second passage 318, fluid may be driven under open channel flow and not via pressure differentials or other forced methods of lubrication, such as described above with reference to FIG. 2.

The first shaft 312 may have a plurality of first shaft channels that extend radially outward from the first passage 316 to the outer surfaces of the first shaft 312. Each channel may include a first shaft outer opening and a first shaft inner opening, each respectively positioned radially about, contiguous, and flush with, the outer surface and the inner surface of the first shaft 312. The inner surface of the first shaft may be the surface of the first passage 316. Lubricant may be expelled in a radially outward direction from the first passage 316 and the first shaft 312 via the first shaft channels via a plurality of tributaries of the first flow path 320. Lubricant on the first flow path 320 not expelled via the first shaft channels through the tributaries may exit the first passage 316 and the first shaft 312 via the second opening.

Likewise, the second shaft 314 may include a plurality of second shaft channels that extend radially outward from the second passage 318 to the outer surfaces of the second shaft 314, which may be arranged similarly to the first shaft channels of the first shaft 312. Each channel may include a second shaft outer opening and a second shaft inner opening, each respectively positioned radially about, contiguous, and flush with, the outer surface and the inner surface of the second shaft 314. The inner surface of the second shaft 314 may be the surface of the second passage 318. Lubricant may be expelled in a radially outward direction from the second passage 318 and the second shaft 314 via the second shaft channels via a plurality second of tributaries. Lubricant not expelled by the second shaft channels through the second tributaries may exit the second passage 318 and the second shaft 314 via the fourth opening.

The first shaft channels and the second shaft channels may supply lubricant to a plurality of consumers positioned, respectively, about first shaft 312 and the second shaft 314, including bearings, races, bushings, gears, meshes between gears, clutches as well as mechanical systems having moving/rotating/rolling/sliding components.

The assembly 302 may have one or more transmission sets, such as gearsets, that may rotationally and drivingly couple the first shaft 312 to the second shaft 314. For an example embodiment the assembly may have eight sets, where each set may be of a different ratio enabling a different speed output when drivingly coupling the first shaft 312 to the second shaft 314. The eight sets may include a first gearset 322, second gearset 324, third gearset 326, a fourth gearset 328, a fifth gearset 332, a sixth gearset 334, a seventh gearset 336, and an eighth gearset 338. Each gearset or other set of the transmission sets may be complementary to a clutch assembly, where the complementary clutch assembly includes a complementary clutch that may selectively couple the set to either the first shaft 312 or the second shaft 314. When selectively coupled to the first shaft 312 or the second shaft 314 via a complementary clutch, a set may drivingly couple the first shaft 312 to the second shaft 314. The first gearset 322 and second gearset 324 may be complementary to a first clutch assembly 342. The third gearset 326 and fourth gearset 328 may be complementary to a second clutch assembly 344. The fifth gearset 332 and sixth gearset 334 may be complementary to a third clutch assembly 346. The seventh gearset 336 and eighth gearset 338 may be complementary to a fourth clutch assembly 348. The first clutch assembly 342 may selectively couple the first gearset 322 or the second gearset 324 to the second shaft 314. The second clutch assembly 344 may selectively couple the third gearset 326 or the fourth gearset 328 to the second shaft 314. The third clutch assembly 346 may selectively couple the fifth gearset 332 or the sixth gearset 334 to the first shaft 312. The fourth clutch assembly 348 may selectively couple the seventh gearset 336 or the eighth gearset 338 to the first shaft 312. The first clutch assembly 342, second clutch assembly 344, third clutch assembly 346, and the fourth clutch assembly 348 may be synchronizers. The fifth gearset 332, the sixth gearset 334, the seventh gearset 336, and the eighth gearset 338 may include idler gears.

A plurality of bearings, bearing assemblies, and bushings may support components and features of the assembly 302. A bushing 350 may be inserted near the port 321 near the second side 306 (e.g., the right side). The bushing 350 may fit to the first passage 316. The bushing 350 may be arranged between the first side 304 and the port 321 along the first axis 308. The bushing 350 may be positioned opposite to an end of the port 321 that is nearest to the second side 306. The bushing 350 may prevent back flow of fluid in the direction of the second side 306 through the port 321.

A first bearing assembly 352 may support and be positioned about the first shaft 312. The first bearing assembly 352 may be positioned around, such as radially about, and be in surface sharing contact with the first shaft 312. A second bearing assembly 354 may support and be positioned about the second shaft 314. The second bearing assembly 354 may be positioned around, such as radially about, and be in surface sharing contact with the second shaft 314. The first and second bearing assemblies 352, 354 may include an inner race an, outer race, and a plurality of bearings. For an example first and second bearing assemblies 352, 354 may include ball bearings. Alternatively, the first and second bearing assemblies 352, 354 may include needle bearings or roller bearings.

In addition to the bearings of the first and second bearing assemblies 352, 354, the assembly 302 may include a plurality of third bearings 356, a plurality of fourth bearings 358, a sixth bearing 362, a seventh bearing 364, a plurality eighth bearings 366, a plurality of ninth bearings 368, a plurality of tenth bearings 370, a plurality of eleventh bearings 372, and a plurality of twelfth bearings 374. The third bearings 356, the fourth bearings 358, fifth bearings 360, the eighth bearings 366, the ninth bearings 368, the tenth bearings 370, the eleventh bearings 372, and the twelfth bearings 374 may be roller bearings and/or needle bearings, such as needle roller bearings. The sixth bearings 362 and the seventh bearings 364 may be cylindrical roller bearings.

The third bearings 356, fourth bearings 358, the fifth bearings 360, the sixth bearing 362, and the twelfth bearings 374 may be positioned radially around the second shaft 314. The third bearings 356 may be positioned radially between the second shaft 314 and a complementary gear of the first gearset 322. The third bearings 356 may support and allow the complementary gear to spin about the second shaft 314. The fourth bearings 358 may be positioned radially between the second shaft 314 and a complementary gear of the second gearset 324. The fourth bearings 358 may support and allow the complementary gear to spin about the second shaft 314. The fifth bearings 360 may be positioned radially between the second shaft 314 and a complementary gear of the third gearset 326. The fifth bearings 360 may support and allow the complementary gear to spin about the second shaft 314. The twelfth bearings 374 may be positioned radially between the second shaft 314 and a complementary gear of the fourth gearset 328. The twelfth bearings 374 may support and allow the complementary gear to spin about the second shaft 314.

The seventh bearing 364, the eighth bearings 366, the ninth bearings 368, the tenth bearings 370, and the eleventh bearings 372 may be positioned radially around the first shaft 312. The eighth bearings 366 may be positioned radially between the first shaft 312 and a complementary gear of the fifth gearset 332. The eighth bearings 366 may support and allow the complementary gear to spin about the first shaft 312. The ninth bearings 368 may be positioned radially between the first shaft 312 and a complementary gear of the sixth gearset 334. The ninth bearings 368 may support and allow the complementary gear to spin about the first shaft 312. The tenth bearings 370 may be positioned radially between the first shaft 312 and a complementary gear of the seventh gearset 336. The tenth bearings 370 may support and allow the complementary gear to spin about the first shaft 312. The eleventh bearings 372 may be positioned radially between the first shaft 312 and a complementary gear of the eighth gearset 338. The eleventh bearings 372 may support and allow the complementary gear to spin about the first shaft 312. The seventh bearing 364, the eighth bearings 366, the ninth bearings 368, the tenth bearings 370, and the eleventh bearings 372 may support and be complementary to the idler gears of their respective gearsets.

The first shaft channels described for the first shaft 312 and first passage 316 include a first channel 375, a second channel 376, a third channel 378, and a fourth channel 380. The first channel 375, the second channel 376, the third channel 378, and the fourth channel 380 may each be feed channels, such as feed holes, that may transport lubricant to consumers. The first channel 375 may supply lubricant to consumers via a first tributary 382 of the first flow path 320. The second channel 376 may supply lubricant to consumers via a second tributary 384 of the first flow path 320. The third channel 378 may supply lubricant to consumers via a third tributary 386 of the first flow path 320. The fourth channel 380 may supply lubricant to consumers via a fourth tributary 388 of the first flow path 320. Consumers supplied with lubricant via the first channel 375 may include the eighth bearings 366, the gears of the fifth gearset 332, and the third clutch assembly 346. Consumers supplied with lubricant via the second channel 376 may include the ninth bearings 368, the gears of the sixth gearset 334, and the third clutch assembly 346. Consumers supplied with lubricant via the third channel 378 may include the tenth bearings 370, the gears of the seventh gearset 336, and the fourth clutch assembly 348. Consumers supplied with lubricant via the fourth channel 380 may include the eleventh bearings 372, the gears of the eighth gearset 338, and the fourth clutch assembly 348. There may be a plurality the first channels 375, the second channels 376, the third channels 378, and the fourth channels 380.

It is to be appreciated, that the first shaft 312 and the second shaft 314 may be shafts of prior art; however, the other components of the assembly 302, including the eight gearsets, the ratios of the eight gearsets, the clutches, and supporting components, such as bearings, bearing assemblies, and bushings, are example embodiments of components and features of the present disclosure.

It is to be appreciated that the configuration of the assembly 302 may be non-limiting, where the setup may include a multi-shaft scheme with more shafts than two that may be rotationally coupled via the gearsets of the assembly. It is also to be appreciated that the assembly 302 may be of a configuration enabling the output of less speeds than eight or more speeds than eight. Similar to the example described with reference to FIG. 2, alternative configurations of the assembly 302 may enable two speeds and as many as n speeds.

Turning to FIG. 4 it shows a second view 400 of the assembly 402. The second view 400 is a side view of an assembly 402. The second view 400 shows the assembly 402 sectioned and partially exploded, such that a plurality of inner features of the assembly 402 may be shown via sectioned volumes, such as cuts.

The assembly 402 may have a first side 404 and a second side 406, where the first side 404 is opposite the second side 406 with respect to the assembly 402. The assembly 402 may be centered about a first axis 408. A second axis 410 may be offset from the first axis 408. The second axis 410 is parallel to the first axis 408. A plane 409 may include the first axis 408 and the second axis 410. The first axis 408 may be parallel with, coaxial to, or include the first axis 308 of FIG. 3. The assembly 402 includes the shaft 412 and a gear 414, where the shaft 412 supports the gear 414. The gear 414 may be positioned about the shaft 412, such that the gear 414 may be positioned around and radially about the shaft 412. An exterior 415 may represent a volume, such as packing space, about the assembly 402. The exterior 415 may be located about the shaft 412 and the gear 414. The first side 404 and the second side 406, may correspond with the first side 304 and second side 306 of FIG. 3.

The assembly 402 may be a length 430. The length 430 may be the length of the shaft 412. The sectioned volumes of the assembly 402 include a first cut 416, a second cut 418, a third cut 420, and a fourth cut 421. The first cut 416, the second cut 418, and the third cut 420 are taken on the shaft 412. The surface areas of the first cut 416, the second cut 418, and the third cut 420 are approximately normal to the first axis 408 and the second axis 410. The fourth cut 421 may be taken on the gear 414 and the shaft 412. A first passage 422 may be visible via the first cut 416, second cut 418, and the third cut 420. The assembly 402 is depicted translucent, such that the first passage 422 is visible and represented via dashed lines through the shaft 412 and the gear 414. The first passage 422 may extend through a material of the shaft 412 and parallel with the second axis 410. The first passage 422 may be positioned about the second axis 410, such as to be centered around the second axis 410. When centered around the second axis 410, the first passage 422 may be positioned radially or approximately radially about the second axis 410. The first passage 422 may be machined through the material of the shaft 412. For example, the first passage 422 may be bored, such as gun drill bored, through the shaft 412.

The shaft 412 may have a surface 424 on the second side 406. The surface 424 may be normal to the first axis 408 and the second axis 410. The surface 424 may be elliptical in shape, such as circular in shape. The surface 424 may be centered on the first axis 408, such that a center point of the surface 424 and the first axis 408 intersect. The first passage 422 may have an opening 426, and the first passage 422 may be flush and contiguous with the surface 424 via the first opening 426. The first opening 426 and a second opening 428 may be positioned on the surface 424 such as to have their respective perimeters be flush with and contiguous with the surface 424. The first passage 422 and the first opening 426 may be located about the second axis 410, such that the first passage 422 has a length parallel with second axis 410. The first passage 422 and first opening 426 may be centered about the second axis 410, such as to encircle and have a surface curving radially about the second axis 410. The length of the first passage 422 may be parallel with the length 430. The second opening 428 may be located about the first axis 408, such as to be around the first axis 408. The second opening 428 may not be an opening to a fluid passage or plurality of fluid passage and may serve another function, such as physically coupling the shaft 412 to another component. The second opening 428 may be centered about the first axis 408, such as to encircle and have a surface curving radially about the first axis 408. The first passage 422 may house a bushing, such as bushing 350 of FIG. 3, that may prevent the backflow of fluid housed by the passage 422 through the first opening 426.

The first passage 422 may be a fluid passage, such as a fluid channel, such as a lubrication line. Lubricant may enter the first passage 422 via the first opening 426. The first opening 426 may be an inlet for lubricant and the second side 406 may be an inlet side for lubricant to be received by the assembly 402. For an example, the shaft 412 may be integrated into a forced lubrication system for a transmission. As part of a method for lubrication, the forced lubrication system may transport lubricant to the first opening 426 via a pressure differential, such as via a pressure differential generated via a pump. Upon entering the first opening 426 and the first passage 422, lubricant or other fluid may be driven under open channel flow and not via pressure differentials or other forced methods of lubrication, such as described above with reference to FIG. 2-3.

The gear 414 may include a plurality of teeth 442. The teeth 442 may be fit to and complementary to at least another gear such as to form a gearset with the another gear. The gear 414 may be physically and rotationally couple to the shaft 412. Additionally or alternatively, the shaft 412 and gear 414 may be part of a single unitary component, where the assembly 402 may be a unitary component. When rotationally coupled to the shaft 412, the gear 414 may rotate/spin with the shaft 412. The gear 414 may include a surface 446 and a lip 450 located about shaft 412, such as around, circumferentially surrounding, and encircling shaft 412. The teeth 442 may be supported by the lip 450. The teeth 442 may physically couple the lip 450, such as via joining or being machined or molded from the same material. The teeth 442 may be positioned radially around the lip 450, such as to encircle the lip 450. A valley 448 may be positioned axially and radially, with respect to the first axis 408, between the lip 450 and the surface 446. The valley 448 may curve from the lip 450 in a radially inward direction toward the surface 446.

The shaft 412 may have a diameter that is variable, such that the shaft 412 may include a plurality of lands of different diameters. For an example embodiment, the shaft 412 may have a first land 452, a second land 454, a third land 456, a fourth land 460, and a fifth land 462 that are of different diameters. Each of the first land 452, the second land 454, the third land 456, the fourth land 460, and the fifth land 462 may have an outer surface, where the outer surfaces may be cylindrical and curve about the respective land of that surface. For example, the second land 454 may have a first outer surface 458, and the third land 456 may have a second outer surface 459. The first outer surface 458 and the second outer surface 459 may curve around the second land 454 and third land 456, respectively, and be cylindrical in shape. The first land 452 may be located between the first side 404 and the second side 406. For example, lubricant may be spread in a radial direction, with respect to the first axis 408, from the interior passages of the shaft 412 outer surfaces of the shaft 412, including the first outer surface 458 and/or the second outer surface 459.

The shaft 412 may include a plurality of channels that extend radially outward from the first axis 408 and are in fluid communication with the first passage 422, including a first channel 474 and a second channel 476. The plurality of channels may include at least two axially spaced apart radial channels. When axially spaced, the channels are spaced such as to be on different non parallel axes. The two axially spaced apart radial channels may be radial to an axis, such as to extend radially from the first axis 408. The axially spaced apart radial channels may include the first channel 474 and the second channel 476. The first channel 474 may have a first centerline 478 (e.g., a first axis) that the first channel is centered about such as to be radially around. The second channel 476 may have a second centerline 480 (e.g., a second axis) that the first channel is centered about such as to be radially around. The first centerline 478 and second centerline 480 may intersect with the first axis 408, such as for an example being perpendicular with the first axis 408. The first centerline 478 and the second centerline 480 may extend at different angles from the plane 409. The first channel 474 and second channel 476 may place the first passage 422 in fluid communication with outer surfaces of the shaft 412. For example, the first channel 474 may place the first passage 422 in fluid communication with the first outer surface 458. The second channel 476 may place the first passage 422 in fluid communication with the second outer surface 459. The first channel 474 and second channel 476 may each have a first opening, (e.g., an inner opening) flush with and contiguous with the first passage 422. Each first opening of the first channel 474 or second channel 476 may fluidly couple the first channel 474 or the second channel 476 to the first passage 422. The first channel 474 and second channel 476 may each have a second opening, (e.g., an outer opening) flush with and contiguous with an outer surface complementary to the first channel 474 or the second channel 476. The second opening of the first channel 474 may be flush and contiguous with the first outer surface 458. The second opening of the second channel 476 may be flush and contiguous with the second outer surface 459. Each second opening of the first channel 474 or second channel 476 may fluidly couple the first channel 474 or the second channel 476 to a complementary outer surface of the shaft 412. For example, the first channel 474 may fluidly couple the first passage 422 to a first outer surface of the second land 454. Fluid may exit the first passage 422 and be spread to the first outer surface of the second land 454 via the first channel 474. For this or another example, the second channel 476 may fluidly couple the first passage 422 to a third outer surface of the third land 456. Fluid may exit the first passage 422 and be spread to the third outer surface of the third land 456 via the second channel 476.

For an example, the first channel 474 and/or second channel 476 may be feed channels, such as feed holes, that may supply consumers positioned about the shaft 412 with lubricant. Lubricant removed from a fluid passage via feed holes may be sent to lubricate consumers fluidly coupled to the first channel 474 and/or second channel 476, respectively. The shaft 412 may have additional channels that are radial channels with centerlines extending at different angles from the plane 409 than the first channel 474 and the second channel 476. The additional channels may be feed channels. For example, there may be four feed channels with centerlines that extend at different angles from the plane 409, where the four feed channels include the first channel 474 and the second channel 476. Each of the four feed channels may direct lubricant to a separate consumer, such as the eighth bearings 366, the ninth bearings 368, the tenth bearings 370, and the eleventh bearings 372 of FIG. 3.

For an example the first channel 474 and/or second channel 476 may be bleed channels, such as bleed holes. As bleed channels the first channel 474 and/or second channel 476 may remove lubricant from the first passage 422. Lubricant removed from a fluid passage via bleed holes may be sent to utilizers, such as utilizers fluidly coupled to the first channel 474 and/or second channel 476, respectively. Utilizers may utilize lubricant while not being lubricated as a consumer of lubricant. For example, a utilizer may be a reservoir and/or pump that may collect and send lubricant to lubricate other component of the assembly 302 or the vehicle housing the assembly 302, such as vehicle 100 of FIG. 1. For another example, a utilizer may be a fluid motor/generator that may recover power and energy from the fluid flow of excess lubricant. For another example, the utilizer may be a heat exchanger or a fluid passage with a lubricant flow to a heat exchange.

Turning to FIG. 5, it shows a third view 600 of the first shaft 612. The third view 600 is a sectional view of the first shaft 612 taken on a plane that is parallel with a plane formed by the x and z axes of the reference axes 301. Turning to FIG. 6 it shows a fourth view 650 of the second shaft 662. The fourth view 650 is a sectional view of the second shaft 662 taken on a plane that is parallel with a plane formed by the x and z axes of the reference axes 301. The components and features of FIGS. 5-6 may be discussed collectively, herein.

The first shaft 612 and the second shaft 662 are shafts of different example embodiments. The first shaft 612 is an example of a shaft of the present disclosure. The second shaft 662 is an example of a shaft of prior art. The first shaft 612 and the second shaft 662 are shown schematically with relative scaling and positioning. The first shaft 612 may be a schematic and simplified representation of shafts of the present disclosure discussed previously, such as the shaft 412 of FIG. 4.

The first shaft 612 may be centered about a first axis 608, such that the first shaft 612 may be positioned approximately radially around the first axis 608. The first axis 608 is a rotational axis for the first shaft 612. There is also a second axis 610 that is parallel with and offset from the first axis 608. The first axis 608 and the second axis 610 may be longitudinal axes for the first shaft 612. The first shaft 612 has an outer surface 614. The first shaft 612 and the outer surface 614 may be approximately cylindrical in shape. Additionally or alternatively, the first shaft 612 may include a plurality of cylindrical shapes with a plurality of cylindrical outer surface including the outer surface 614.

The first shaft 612 may have a first passage 622. The second shaft 662 may have a second passage 672. The first passage 622 may be a volume formed and extending through a material 620 composed by the first shaft 612. The first passage 622 may have a surface 624 separating the volume of the first passage 622 from the material 620. The surface 624 is an inner surface of the first shaft 612. The first passage 622 is offset from the center of the shaft and the first axis 608. The first passage 622 and the surface 624 may be positioned radially about the second axis 610, where the second axis 610 may be a central axis for the first passage 622. The first shaft 612 may not have a passage that encircles or surrounds the first axis 608. The first axis 608 may extend through the material 620 of the first shaft 612. The surface 624 may be an inner surface for the first passage 622 and the first shaft 612. The second passage 672 may be concentric to the second shaft 662, where the second passage 672 has a surface 674. Both the first passage 622 and the second passage 672 are longitudinal.

The first passage 622 and the second passage 672 may house a fluid 632 for their respective shafts 612, 662. The fluid 632 may be lubricant, such as oil. Likewise, the first shaft 612 and the second shaft 662 may be rotated at an angular velocity (ω) 630, where the ω 630 is the same for both the first shaft 612 and the second shaft 662. When the second shaft 662 is rotated at the ω 630, the fluid 632 may have a height 686 extending away from surface 674. The fluid 632 may be equidistant from the axis of rotation of the second shaft 662 when housed by the second shaft 662, such as when the second shaft 662 rotates at the ω 630. The height 686 may be approximately uniform between the surface 674 and the surface of the fluid 632. The fluid 632 may be equidistant from the first axis 608 (e.g., the axis of rotation) when housed by the first shaft 612, such as when the first shaft 612 rotates at the ω 630. When the first shaft 612 is rotated at the ω 630, the fluid 632 may have a height 636 extending away from the surface 624. The height 636 may be a distance between the surface 624 of the first passage 622 and a fluid surface 634 created from the fluid 632. The fluid surface 634 may be or may be part of a film. The fluid surface 634 may be a fluid-free surface, where the fluid moves under the action of the applied field of force, such as force gravity or a centripetal force from ω 630. Being equidistant from the first axis 608, the fluid surface 634 has a has a circular arc shape that is on the perimeter of a circle that extends radially from the first axis.

Due to offsetting the first passage 622 from the first axis 608 and the fluid surface 634 being equidistant from the first axis 608, the height 636 is not uniform and varies at different points on surface 624. The fluid surface 634 lies on a cylinder or circle, where the cylinder/circle is an orbit around the first axis 608 (e.g., the rotational axis of the first shaft 612). Centering the first passage 622 on an orbital path around the rotational axis as opposed to the rotational axis, may vary the height of the fluid surface 634 and induce the fluid surface 634 to have circular arc shape. The height 636 is smaller at positions on the surface 624 that are closer in distance to the first axis 608. The height 636 is greater at positions on the surface 624 that are further from the first axis 608. The height 636 may be at a maximum at a position on the surface 624 that is furthest from the first axis 608.

Turning to FIG. 7, it shows a fifth view 700 of the first shaft 612. The fifth view 700 is a sectional view of the first shaft 612 taken on a plane that is parallel with a plane formed by the x and z axes of the reference axes 301. The fifth view 700 is a schematic view, showing first shaft 612, other features, and dimensions schematically.

The first shaft 612 may be divided by a first line 712-line A-A. The first line 712 may be perpendicular to the first axis 608 and may be vertical relative to the z axis of the reference axes 301. A sectional view of the first shaft 612 may be taken on the first line 712, where the sectional view may be a perspective of a plane parallel with a plane formed on the y and z axes that includes the first line 712. The plane may be a plane 724. The plane 724 cross-sections the first shaft 612 longitudinally. The plane 724 may section the first shaft 612 along first axis 608 and the second axis 610. The first shaft 612 may also have a cylinder/circle 720. The cylinder/circle 720 may be an orbit and rotational path around the first axis 608. The fluid surface 634 may meet and curve with the cylinder/circle 720. The circular arch shape of the fluid surface 634 may curve and touch the perimeter of the cylinder/circle 720. The cylinder/circle 720 may have a radius 728.

An alpha angle (a) 722 may be overlaid on the first shaft 612. The alpha angle 722 is a first angle at which a channel, such as a bleed hole or a feed hole, may be angled from the axis of the channel and a plane that contains the axis of the shaft and the axis of the lubrication line, such as the first axis 608 of the first shaft 612 and the second axis 610 of the first passage 622, respectively. For this example, the alpha angle 722 is between the plane 724 and an axis 726. The axis 726 may be separated, extended, and inclined from the plane 724 at the alpha angle 722. The plane 724 includes the first axis 608 and the second axis 610. For an example embodiment of the first shaft 612, the alpha angle 722 may be an angle of 30 degrees. The axis 726 may be centerline for a channel, such as a bleed hole or a feed hole.

The first passage 622 may be a first diameter 730. A distance (e distance) 732 may separate the first axis 608 and the second axis 610. The first shaft 612 is to be operated to rotate at an ω 630 that is greater than a first threshold, where the first threshold is a minimum angular velocity ($\omega_{min}$). At the $\omega_{min}$ and greater angular velocities, a force may be generated by the first shaft 612 to drive lubricant in a radially outward direction from the first axis 608, keep the height 636 variable, and keep the fluid surface 634 a fluid-free surface. The $\omega_{min}$ may be represented by the following first equation (e.g., equation 1) below.

$$\omega_{min} = \sqrt{g/e} \tag{1}$$

The $\omega_{min}$ is the square root of the quotient of a gravitational acceleration on the shaft taken by the e distance 732, where g is the gravitational acceleration and e is the e distance 732.

FIG. 7 shows additional details about height 636 of the fluid 632. The height 636 may be a first height 744 at a first point on a first axis 742. Likewise, the height 636 may be a second height 754 at a second point on a second axis 752. The first axis 742 and the second axis 752 may be longitudinal, and may touch and extend with the surface 624. The first axis 742 may be positioned on the surface 624 at a furthest distance from the first axis 608. The second axis 752 may be positioned on the surface 624 at a closest distance to the first axis 608. The height 636 may be a third height 756 from a third point, where the third point is a point on the surface 624 between the first axis 742 and the second axis 752. The first height 744 may be a maximum (e.g., a maximum height), where the height 636 is the greatest distance with respect to the distance between the fluid surface 634 and the surface 624. At $\omega_{min}$ and greater angular velocities, the first height 744 may be a distance to prevent adhesive forces between the fluid 632 and the surface 624 from stopping the flow of the fluid 632 in a longitudinal direction or a radial direction with respect to the first shaft 612. The third height 756 may be a minimum (e.g., a minimum height), where the height 636 is the smallest distance with respect to the distance between the fluid surface 634 and the surface 624. The third height 756 may be at a point where the cylinder/circle 720 meets/intersects with the surface 624. The third height 756 may extend from a point on the surface that is approximately the same distance from the first axis 608 as the radius 728. The third height 756 may be approximately zero or infinitesimally small. However, it is to be appreciated that the third height 756 may not be zero. The second height 754, may be a null (e.g., approximately zero) or infinitesimally small, where there may be no or an infinitesimally small amount of fluid 632. The second axis 752 may be a distance from the first axis 608 that is less than the radius 728. The height 636 may be null or infinitesimally small at points on the surface 624, where the points are a distance from the first axis 608 that is less than the radius 728. At points between the point on the surface 624 for the third height 756 and points on second axis 752, the height 636 may be null or infinitesimally small. At the aforementioned points on the surface 624, there may be approximately null or an infinitesimally small amount of lubricant in contact with the surface 624.

The height 636 may decrease in a longitudinal direction further from an inlet to the first passage 622, due to bleed holes, feed holes, and other fluid channels that may fluidly couple to the first passage 622. For example, the first height 744 may decrease in distance at points on the first axis 742 that are further from an inlet to the first passage 622. Likewise, the cylinder/circle 720 may widen and the third height 756 may be positioned at points on the surface 624 closer to the first axis 608.

Turning to FIG. 8, it shows a sixth view 800 of the first shaft 612. The sixth view 800 is a sectional view, where the sixth view 800 is taken on the first line 712 of FIG. 7. The first shaft 612 has a first side 804 and a second side 806, where the first side 804 is opposite the second side 806. The views of FIG. 5 and FIG. 7 were shown at a perspective from the first side 804. A second line (line B-B) 812 and a third line (line C-C) may divide the first shaft 612. A sectional view may be taken on the second line 812, where the sectional view may be taken on a plane that includes the second line 812 and is parallel with a plane formed by the x and z axes. A sectional view may be taken on the third line 814, where the sectional view may be taken on a plane that includes the third line 814 and is parallel with a plane formed by the x and z axes. The sectional view taken on the second line 812 may be shown in FIG. 9. A composite view of sectional views may be taken on the second line 812 and the third line 814, where the composite view may be a composite of a first plane that includes the second line 812 and a second plane that includes the third line 814 that are parallel with a plane formed by the x and z axes. The composite view of sectional views may be shown in FIG. 10.

The first passage 622 may have an inlet 822. The inlet 822 may be an opening via which the first passage 622 may receive a work fluid, such as lubricant. The first passage 622 may be a blind passage, such as a blind hole. There may be a countersink 824 at the end of the first passage 622 opposite the inlet 822. The inlet 822 may be on the first side 804 of the first shaft 612, and the countersink 824 is nearer to the second side 806 from the inlet 822.

The first passage 622 may fluidly couple and be in fluid communication with a plurality of channels, where each of the channels may have an opening that is an outlet for the first passage 622. Openings that are outlets may place the first passage 622 and their respective channels in fluid communication with the surface 614 and the exterior 415. Some or all of the channels may extend radially outward with respect to the first axis 608. There may be at least two channels (e.g., a pair of channels) in fluid communication with the first passage 622 that include outlets. The first shaft 612 includes a first channel 832 and a second channel 834 that are in fluid communication with the first passage 622. The first channel 832 and the second channel 834 may each be bleed channels, such as bleed holes, for the first shaft 612 and the first passage 622. The first channel 832 and the second channel 834 may fluidly couple and be in fluid communication with the surface 614 and the exterior 415. The surface 614 and/or other surface of the first shaft 612 may be lubricated via the first channel 832 and the second channel 834. For an example, there may be at least two feed channels, where the first channel 832 and the second channel 834 may be the two feed channels. For another example, there may be at least two bleed channels, where the first channel 832 and the second channel 834 may be the two bleed channels. For another example, the first shaft 612 may have at least a feed channel and at least a bleed channel, where the first channel 832 or second channel 834 may be either the feed channel or the bleed channel.

It is to be appreciated that the first shaft 612 may have channels in addition to the first channel 832 and the second channel 834 that extend in a radial direction from the first axis 608 and fluidly couple the first passage 622. For another example, there may be a third channel that fluidly couples the first passage 622, and extends in a radial direction from the first axis 608. The third channel may be longitudinally between the second channel 834 and the second side 806, such as longitudinally between the second channel 834 and the countersink 824. The third channel may be in fluid communication with the first passage 622 and place the first passage 622 in fluid communication with the surface 614 and/or other surfaces of the first shaft 612 and the exterior 415. For this or other examples, there may be an n channel that fluidly couples the first passage 622, and extends in a radial direction from the first axis 608. The n channel may be may be longitudinally between the $n_{-1}$ channel (e.g., a previous channel closest to the n channel from the first side 804) and the second side 806, such as longitudinally between the $n_{-1}$ channel and the countersink 824. The n channel may be in fluid communication with the first passage 622 and place the first passage 622 in fluid communication with the surface 614 and/or other surfaces of the first shaft 612 and the exterior 415.

The first channel 832 is centered about a first centerline 842 (e.g., a first axis), such that the first channel 832 is radially around and curves about the first centerline 842. The second channel 834 is centered about a second centerline 844 (e.g., a second axis), such that the second channel 834 is radially around and curves about the second centerline 844. A first plane parallel with the x and z axes of the reference axes 301 and taken on the second line 812 may include the first centerline 842. A second plane parallel with the x and z axes of the reference axes 301 and taken on the third line 814 may include the second centerline 844. The first centerline 842 and the second centerline 844 may extend and incline in radial directions from the first axis 608.

The first channel 832 has at least two openings, such as for an example a first opening 852 and a third opening 862. The second channel 834 has at least two openings, such as for an example a second opening 854 and fourth opening 864. The first opening 852 and second opening 854 may be flush and contiguous with the surface 614. The third opening 862 and fourth opening 864 may be flush with and contiguous with the surface 624. The third opening 862 may fluidly couple and place the first passage 622 in fluid communication with the first channel 832, such that fluid from the first passage 622 may enter the first channel 832 via the third opening 862. The first channel 832 may fluidly couple and place the third opening 862 in fluid communication with the first opening 852. The first opening 852 may fluidly couple and place the first channel 832 and fluid communication with the surface 614, such that lubricant or another fluid may exit the first channel 832 via the first opening 852 and coat the surface 614. The fourth opening 864 may fluidly couple and place the first passage 622 in fluid communication with second channel 834, such that fluid from the first passage 622 may enter the second channel via the fourth opening 864. The second channel 834 may fluidly couple and place the fourth opening 864 in fluid communication with the second opening 854. The second opening 854 may fluidly couple and place the second channel 834 in fluid communication with the surface 614, such that lubricant may exit the second channel 834 via the second opening 854 and coat the surface 614. Lubricant may also exit the first and second channels 832, 834 and be passed to the exterior 415 via the first opening 852 and second opening 854, respectively. The first opening 852 and the second opening 854 may be outlets for their respective channels 832, 834 and for the first passage 622.

For other examples, other fluid channels, such as a third channel, a fourth channel, or an n numbered channel (n channel), may have at least one opening in fluid communication with the first passage 622 and at least another opening in fluid communication with the surface 614, another outer surface of the first shaft 612, and/or the exterior 415. For these example, the at least one opening of each of the other fluid channels may be flush with and contiguous with the surface 624 of the first passage 622. Likewise, the at least another opening of each of the other fluid channels may be flush with and contiguous with the surface 614 or another outer surface of the first shaft 612.

Turning to FIG. 9, it shows a seventh view 900 of the first shaft 612. The seventh view 900 is a sectional view, where the seventh view 900 is taken on the second line 812 of FIG. 8.

The first shaft 612 may include a bushing 940. The bushing 940 may be of a first diameter and a second diameter 942, where the first diameter is an outer diameter and the second diameter 942 is an inner diameter of the bushing 940. The first diameter of the bushing 940 may be approximately the first diameter 730 of the first passage 622. Likewise, the bushing 940 have a thickness 944. The thickness may be approximately the difference between the first diameter 730 and the second diameter 942. The bushing 940 may prevent backflow toward the inlet 822 of FIG. 8. A schematic boundary of dimensions of the bushing 940 is show via dashed lines. The bushing 940 may be positioned longitudinally between the inlet 822 and the first channel 832, and therein in the direction of the first side 804 from the first channel 832 in the seventh view 900.

The seventh view 900, shows the first centerline 842 may be parallel with the axis 726 of FIG. 7, such that the first centerline 842 is separated from, extended by, and inclined via the alpha angle 722 from the plane 724.

Turning to FIG. 10, it shows an eighth view 1000 of the first shaft 612. The eighth view 1000 is a composite of sectional views, where the eighth view 1000 includes the features and components of the seventh view 900 but where features and components from a sectional view taken on the third line 814 of FIG. 8 are super imposed. Features and components from the sectional view taken on the third line 814 include the second channel 834, including the second opening 854 and fourth opening 864.

The eighth view 1000 shows a beta angle (B), where the beta angle 1022 is a second angle at which a channel, such as a bleed hole or a feed hole, may be angled at. Each beta angle 1022 is complementary to a channel or a plurality of channels that are located further longitudinally from the inlet 822 from compared to the first channel 832. For this example, the second channel 834 is complementary to the beta angle 1022, such that the second centerline 844 is separated, extended, and inclined from the plane 724 via the beta angle 1022. The beta angle 1022 is a different size from the alpha angle 722. The beta angle 1022 may be less than the alpha angle 722. The relationship between the alpha angle 722 and the beta angle 1022 may be represented by a second equation (e.g., equation 2) below.

$$\beta \le \frac{\alpha}{2} \tag{2}$$

The beta angle 1022 may be less than or equal to half the size of the alpha angle 722. For example, if the alpha angle 722 is 30 degrees, the beta angle 1022 is at least 15 degrees. Alternatively, for another example, if the alpha angle 722 is 30 degrees, the beta angle 1022 may be less than 15 degrees, such as 14 degrees. Alternatively, for another example, if the alpha angle 722 is 60 degrees, the beta angle 1022 is at least 30 degrees. Alternatively, for another example, if the alpha angle 722 is 60 degrees, the beta angle 1022 is less than 30 degrees, such as 29 degrees.

It is to be appreciated that each additional channel (e.g., the n channel described) may have a centerline that may extend and incline at an n angle from the plane 724. The n angle is half or less than half the size of the angle of the last channel (e.g., an $n_{-1}$ channel), where the last channel is the closest channel to the additional channel and longitudinally between the inlet 822 of FIG. 8 and the additional channel. For example, the first shaft 612 may have a third channel in addition to the first channel 832 and the second channel 834, where the third channel is longitudinally further from the inlet 822 from the second channel 834. The third channel may have and be centered about a third centerline (e.g., a third axis), where the third centerline extends and inclines at gamma (γ) angle from the plane 724. The gamma angle may be a third angle. The gamma angle is a different size from the beta angle 1022 and alpha angle 722. The mathematical relationship between the beta angle 1022 and gamma angle represented by a third equation (e.g., equation 3) below.

$$\gamma \le \frac{\beta}{2} \tag{3}$$

The gamma angle may be less than or equal to half the size of the beta angle 1022. For an example, the alpha angle 722 may be 60 degrees, the beta angle 1022 may be at least 30 degrees, and the gamma angle may be at least 15 degrees. For other examples, the alpha angle 722 may be 60 degrees, the beta angle 1022 may be 30 degrees, and the gamma angle may be less than 15 degrees, such as 14 degrees.

For an example the third channel may be a bleed channel, such as a third bleed channel. As a third bleed channel, the third channel may be in fluid communication with and supply lubricant to a utilizer. For another example, the third channel may be a feed channel, such as a third feed channel, where the third channel may supply a consumer with lubricant.

The alpha angle 722, the beta angle 1022, and the gamma angle may prevent the maximum volumetric flowrate of lubricant from entering the first channel 832, the second channel 834, and the third channel respectively. The lubricant housed by and flowing through the first passage 622 may have a fluid surface such as a fluid-free surface that has a circular curvature and is equidistant from the rotational axis, such as fluid surface 634 of FIG. 5. The circular curvature may curve with the perimeter of a cylinder or a circle representing centered around the first axis 608. The equidistance from the rotational axis and curvature gives the fluid a variable height from the surface 624, such as height 636. The curvature of the fluid surface and the variable height may place the fluid below the of lubricant lower than the full cross sectional area of the openings to each of the first channel 832, the second channel 834, and the third channel, where portions of the diameters of the openings to the first channel 832, the second channel 834, and the third channel may be within the diameter of the curve of the fluid surface. A portion of the surface 624 or a feature in fluid communication with the first passage 622 that is within the radius of the curvature of the fluid surface, may have approximately no or an infinitesimally small amount of lubricant. For this example, lubricant may not be received at all points on the cross sectional area of the third opening 862. Likewise, lubricant may not be received at all point on cross sectional area of the fourth opening 864. Additionally, lubricant may not be received at all points on the cross sectional area of an opening to the third channel in fluid communication with the first passage 622. The maximum fluid flow through an opening may be dependent on how much lubricant a cross sectional area of the opening, where the cross sectional area of the opening is dependent on the diameter of the opening. Therein, only part of the cross sectional areas of each of the first channel 832, the second channel 834, or the third channel may receive a fluid flow, and the fluid flow is reduced compared to from the maximum fluid flowrate of the respective channel. Likewise, as fluid is drained, the fluid height may decrease and the radius of the curvature of the fluid surface may increase. The radius of the curvature of the fluid surface may grow, such that the openings to the first channel 832, the second channel 834, and/or the third channel are fully within the radius. Openings that are within the radius of the curvature of the fluid surface may not receive lubricant or another fluid housed via the first passage 622. The reduction of fluid flow through the first channel 832, the second channel 834, and/or the third channel may reduce excess lubricant flow, where excess lubricant flow may be the amount of volumetric flowrate that is greater than a desired threshold of volumetric flowrate to feed a consumer. Reduction in excess lubricant flow may reduce power losses, such as from power lost from splashing of lubricant and flow of lubricant lost that may be used for use for utilizers or other consumers.

For example, the first shaft 612 may have four feed channels. The four feed channels may include axially spaced apart channels of the first shaft 612, such as the first channel 832, the second channel 834, the third channel, and a fourth channel. The fourth feed channel may be located after the third feed channel, where the fourth channel is longitudinally further from the inlet 822 compared to the third feed channel. The fourth channel may have and be centered about a fourth centerline (e.g., a fourth axis), where the fourth centerline extends and inclines at a fourth angle from the plane 724. The fourth angle half or less than half the size of the gamma angle from the plane 724. Each of the four feed channels may direct lubricant to a separate consumer from the consumers that may be fed by the first channel 832, the second channel 834, or the third channel. At least four consumers may be fed via the four feed channels, such as the eighth bearings 366, the ninth bearings 368, the tenth bearings 370, and the eleventh bearings 372 of FIG. 3.

For other examples, the first shaft 612 have one or more of a plurality of feed channels that may supply lubricant to consumers and are fluidly coupled to the first passage 622. For these examples there may be one or more of the feed channels that fluidly couple to the first passage 622, where the fluid coupling is longitudinally between the fluid coupling of bleed channels, such as longitudinally between the first channel 832 and the second channel 834 and/or longitudinally between the second channel 834 and the third channel.

The first channel 832 may include a first countersink 1042. The second channel 834 may include a second countersink 1044. The first and second countersinks 1042, 1044 may be above the first passage 622 and second axis 610. The first and second countersinks 1042, 1044 may be positioned at the most radially inward positions of the first channel 832 and second channel 834, respectively. The first countersink 1042 may be positioned radially between the third opening 862 and the first axis 608. The second countersink 1044 may be positioned radially between the fourth opening 864 and the first axis 608.

The first channel 832 may have a first length 1072, and the second channel 834 may be a second length 1074. The first length 1072 may be a distance extending from the first opening 852 to the approximate point where the first countersink 1042 terminates. The second length 1074 may be a distance extending from the second opening 854 to the approximate point where the second countersink 1044 terminates. The first length 1072 and second length 1074 may extend in a radially inward direction from the surface 614.

The first channel 832 may be of a third diameter 1082, and the second channel 834 may be of a fourth diameter 1084. The third diameter 1082 and fourth diameter 1084 may be approximately equal in distance. For example, the third diameter 1082 may range from 5 mm to 8 mm in distance. Likewise, for this or another example, the fourth diameter 1084 may range from 5 mm to 8 mm in distance.

A force (e.g., a centripetal force) may be generated by the first shaft 612 to drive lubricant in a radially outward direction from the first axis 608, keep the height 636 variable, and keep the fluid surface 634 a fluid-free surface.

The first shaft 612 may be integrated into a forced lubrication system for a transmission. As part of a method of lubrication, that may include the methods of lubrication using the first and second shafts 208, 210 of FIG. 2 and the shaft 412 of FIG. 4, in addition to lubricating via the first shaft 612, the first shaft 612 may be rotated at the $\omega_{min}$ and greater angular velocities. The forced lubrication system may transport lubricant, such as fluid 632, to an inlet of the first shaft 612, such as the inlet 822 of FIG. 8. The forced lubrication system may transport lubricant to the inlet via a method of forced lubrication, such as a pressure differential. The pressure differential may be generated via a pump, such as the first pump 266 or the second pump 268 of FIG. 2. The lubricant may enter a passage of the shaft, such as the first passage 622 of FIG. 5, via the inlet. Upon entering the passage, lubricant may be driven under open channel flow and not via pressure differentials or other forced methods of lubrication, and therein the lubricant may be driven under open channel flow under the action of applied forces and have a fluid free surface. Applied forces may include the force from the rotation of the first shaft 612. At the $\omega_{min}$ and greater angular velocities, the force of rotation on the first shaft 612 may force the fluid to have a height that is variable (e.g., a variable height), such as the height 636 of FIG. 5. Height of the fluid may be radial relative to a rotational axis of the first shaft 612, such as the first axis 608, Height of the fluid may be relative to and a distance between a surface of the passage and a fluid surface of the fluid, such as the surface 624 and the fluid surface 634, respectively. The fluid surface may be equidistant from the axis of rotation of the first shaft 612. The fluid surface may have a circular curvature that follows a perimeter of a cylinder or a circle positioned radially about the rotational axis. The variable height may vary between the first height and the second height at a first point on a first axis and at a second point on a second axis, respectively, where the first axis and the second axis are on the surface of the passage. The first height may be a maximum height, such as the first height 744 of FIG. 7. The second height may be a minimum height, such as the third height 756 of FIG. 7. The forces generated by the rotation of the first shaft 612 at the $\omega_{min}$ and greater angular velocities, may be in a radial direction relative to the axis of rotation and may urge fluid radially outward via channels fluidly coupled to the passage.

For a first example of the method of lubrication, there may be at least two channels that may each fluidly couple to the passage via a respective opening. Each passage may fluidly couple a respective opening to the passage and at least an outer surface of the first shaft 612, such as surface 614. The two channels include a first channel and a second channel. The first channel may be the first channel 832 and the second channel may be the second channel 834. The method includes driving the first flow of fluid from the passage through a first opening, such as via urging the fluid via one or more of the plurality of radially directed forces on the first shaft 612. The first opening fluidly couples the first channel. The method includes driving the first flow of the fluid 632 through the first opening and the first channel, such as via one or more of the radially directed forces on the first shaft 612. The first channel extends along a first axis, such as the first centerline 842. The first axis extends at a first angle from a longitudinal plane that includes the rotational axis. The method includes driving the first flow out of the first channel via a second opening via forces on the first shaft 612. The method includes driving a second flow of the fluid from the fluid passage through a third opening, such as via urging the fluid via one or more of the radially directed forces on the first shaft 612. The third opening is fluidly coupled to the second channel. The method includes driving the second flow through the second opening and the second channel, such as via the radially directed forces. The second channel extends along a second axis, such as the second centerline 844. The second axis extends at a second angle from the longitudinal plane including the rotational axis. The second angle is a different size from the first angle. The method includes driving the second flow out of the second channel via a fourth opening, such as via the radially directed forces on the first shaft 612. The first and second opening of the first channel may be the third opening 862 and first opening 852, respectively, of FIG. 8. The third and fourth opening of the fourth channel may be the fourth opening 864 and second opening 854, respectively, of FIG. 8. The method may include driving the lubricant from the passage via one or more of a plurality of flows, where the plurality of flows of the fluid may be driven out from the passage via other channels that are longitudinally further from the inlet compared to the first and second channel. The other channels may be feed channels. The fluid may be driven through the other channels via being urged by the one or more radial forces on the first shaft 612. The method may include driving remaining fluid in the passage not driven out of the first shaft 612 via the other channels, out of the first shaft 612 via an outlet.

For a second example of the method of lubrication, there may be at least three channels that may each fluidly couple to the passage via a respective opening. The three channels include a first channel, a second channel, and a third channel, where each channel fluidly couples a respective opening to the passage and at least an outer surface of the first shaft 612, such as surface 614. The first channel may be the first channel 832, and the second channel may be the second channel 834. The first channel and the second channel may be the first channel and the second channel described in the first example. The first channel extends along a first axis; the second channel extends along a second axis; and the third channel extends along a third axis. The first axis extends at a first angle from the longitudinal plane including the rotational axis. The second axis extends at a second angle from the longitudinal plane including the rotational axis. The second angle is a different size from the first angle, where the first angle is greater than the second angle. The method includes driving the first flow of fluid through a first opening of the first channel and the second flow of fluid to a third opening of the second channel, such as via urging the fluid via one or more of the plurality of radially directed forces on the first shaft 612. Fluid may be driven in the first flow through the first opening to the outer surfaces of the first shaft 612 via the first channel and a second opening as described in the first example above. Fluid may be driven in a second flow through the third opening to the outer surfaces of the first shaft 612 via the second channel and a fourth opening as described in the first example above. The method includes driving a third flow of the fluid from the fluid passage via a fifth opening, such as via urging the fluid by one or more of the radially directed forces on the first shaft 612. The fifth opening is fluidly coupled to the third channel. The method includes driving the third flow through the fifth opening and the third channel, such as via the radially directed forces. The third channel extends along a third axis. The third axis extends at a third angle from the longitudinal plane including the rotational axis. The third angle is a different size from the first angle and the second angle. The method includes driving the third flow out of the second channel via a sixth opening, such as via the radially directed forces on the first shaft 612. The first and second opening of the first channel may be the third opening 862 and first opening 852, respectively, of FIG. 8. The third and fourth opening of the fourth channel may be the fourth opening 864 and second opening 854, respectively, of FIG. 8. The method may include driving the lubricant from the passage via one or more of a plurality of flows, where the plurality of flows of the fluid may be driven out from the passage via other channels that are longitudinally further from the inlet compared to the first channel, the second channel, and the third channel. The other channels may be feed channels. The fluid may be driven through the other channels, such as via being urged by one or more of the radial forces. The method may include driving remaining fluid in the passage not driven out of the first shaft 612 via the other channels, out of the first shaft 612 via an outlet.

In this way, a lubrication distribution system of a shaft is herein disclosed, where the shaft includes at least a fluid passage that is offset from a central and rotational axis of the shaft, such that an axis and centerline the fluid passage is centered on is not coaxial with the central and rotational axis of the shaft. Where the fluid passage that is offset may lubricate a plurality of consumers, such as eight consumers, via a plurality of complementary fluid passages, such as eight fluid channels, where the consumers may receive constant lubrication while avoiding fluid starvation before an outlet to the shaft. Where the offset position and angular velocity may maintain a fluid-free surface for lubricant housed by the fluid passage. And, where a plurality of channels may be in fluid communication with the fluid passage, extend in a radial direction from the central axis of the shaft, and direct lubricant to the consumers. Where the plurality of channels includes at least two axially spaced apart channels. Where the axially spaced apart channels are centered about axes that extend radially from the axis of the fluid passage, and where the axes extend at different angles from a plane that includes the axis of the fluid passage and the central and rotational axis of the shaft. Where each spaced apart channel that is further from an inlet to the fluid passage than a previous feed axially spaced apart channel extends at a smaller angle than the previous axially spaced apart channel. Each spaced apart axial channel is centered around a centerline (e.g., an axis), and each centerline extends at an angle of the different angles. For example, a first angle of an axially spaced apart channel may be smaller than a second angle of the previous axially spaced apart channel by half or more. The axially spaced apart channels may be feed channels or bleed channels.

In another representation, the axially spaced apart channels include at least two feed channels. Where each feed channel that is further in an axial direction from the inlet to the fluid passage than the previous feed channel extends at a smaller angle than the previous feed channel. A first angle of a feed channel may be smaller than the second angle of the previous feed channel by an angle of half or more. The first channel is centered on a first centerline and the second channel is centered on a second centerline, where the first centerline and the second centerline extend at the first angle and the second angle, respectively, from the plane.

In another representation, there may be at least four axially spaced apart channels. The axially spaced apart channels may include at least four feed channels. Where each feed channel that is further in an axial direction from the inlet to the fluid passage than a previous feed channel extends at a smaller angle than the previous feed channel. Where the first angle of a feed channel may be smaller than the second angle of the previous feed channel by an angle of half or more. Where the four feed channels include a first channel, a second channel, a third channel, and a fourth channel, where the first channel is closest in an axial direction from the inlet, followed by the second channel, the third channel, and the fourth channel, where the fourth channel is furthest in an axial direction from the inlet. Where a fourth angle of the fourth channel is smaller than a third angle of the third channel, the third angle is smaller than a second angle the second channel, and the second angle is smaller than a first angle of the first channel, where the fourth angle, the third angle, the second angle, and the first angle extend from the plane. For a first example, the fourth angle may be half the size of the third angle, the third angle may be half the size of the second angle, and the second angle may be half the size of the first angle. For a second example, the fourth angle may be less than half the size of the third angle, the third angle may be less than half the size of the second angle, and the second angle may be less than half the size of the first angle. Where the first channel is centered on a first centerline, the second angle is centered on a second centerline, the third channel is centered on a third centerline, and the fourth channel is centered on a fourth centerline, where the first centerline, the second centerline, the third centerline, and the fourth centerline extend at the first angle, the second angle, the third angle, and the fourth angle, respectively, from the plane.

In these representations or in another representation, the shaft may include a plurality of other axially spaced apart channels. Where the other axially spaced apart channels are centered about centerlines (e.g., axes) that extend radially from the axis of the fluid passage, and where the centerlines extend at different angles from the plane that includes the axis of the fluid passage and the central and rotational axis of the shaft. Where an axially spaced apart channel that is further from an inlet to the fluid passage than a previous axially spaced apart channel extends at a smaller angle than the previous axially spaced apart channel. Where a first angle of the other axially spaced apart channel may be smaller than a second angle of the previous other axially spaced apart channel by half or more. Where the other axially spaced apart channels are bleed channels.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A lubrication system for a transmission, comprising:
a shaft of the transmission having a fluid passage, where the fluid passage is centered on an axis that is parallel and non-coaxial to a rotational axis of the shaft, where the shaft is centered on the rotational axis; and
at least two axially spaced apart radial channels, where the axially spaced apart radial channels are fluidly communicating with the fluid passage and inclined at different angles with respect to a plane that cross-sections the shaft in a longitudinal direction with respect to the rotational axis, where the plane includes the rotational axis and the axis of the fluid passage, where the different angles decrease in size for each axially spaced apart radial channel that is further from an inlet relative to a previous spaced apart radial channel.

2. The lubrication system of claim 1, where the lubrication system is a forced lubrication transmission system, where the shaft is horizontal to a vertical axis, and the vertical axis is parallel with a direction of gravity.

3. The lubrication system of claim 2, where the axially spaced apart radial channels include at least a bleed channel.

4. The lubrication system of claim 3, where the axially spaced apart radial channels include at least two bleed channels, where the bleed channels include a first bleed channel and a second bleed channel.

5. The lubrication system of claim 4, where the first bleed channel and second bleed channel are angled at a first angle and a second angle from the plane, where a first centerline of the first bleed channel is separated from the plane by the first angle, where a second centerline of the second bleed channel is separated from the plane by the second angle.

6. The lubrication system of claim 5, where the first bleed channel is closer to the inlet than the second bleed channel along a longitudinal axis of the shaft, and the second angle is half the size of the first angle.

7. The lubrication system of claim 5, where the first bleed channel is closer to the inlet than the second bleed channel along a longitudinal axis of the shaft, and the second angle is less than half the size of the first angle.

8. The lubrication system of claim 5, where the axially spaced apart radial channels include a third bleed channel, where the third bleed channel is angled at a third angle, such that a third centerline of the third bleed channel is separated from the plane by the third angle, where the third angle is a different size than the first angle and the second angle.

9. The lubrication system of claim 8, where the second bleed channel is closer to the inlet than the third bleed channel along the axis of the shaft, and where the second angle is greater than the third angle.

10. The lubrication system of claim 9, where the third angle is at least half the size of the second angle.

11. The lubrication system of claim 3, where the axially spaced apart radial channels include at least two of a plurality of feed channels, where each of the feed channels has a first opening and a second opening, where the first opening is flush with and contiguous with an inner surface of the fluid passage, and the second opening is flush with an outer surface of the shaft, where each feed channel is centered on an centerline, where each centerline extends at an angle of the different angles from the plane.

12. The lubrication system of claim 11, where each feed channel is complementary to at least a consumer, where the consumer is positioned to receive lubricant from the second opening.

13. The lubrication system of claim 12, where the shaft includes at least four feed channels, including a first feed channel, a second feed channel, a third feed channel, and a fourth feed channel, where the first feed channel extends at a first angle from the plane, the second feed channel extends at a second angle from the plane, the third feed channel extends at a third angle from the plane, and the fourth feed channel extends at a fourth angle from the plane, where the first angle, the second angle, the third angle, and the fourth angle are different in size.

14. A lubrication system for a transmission comprising:
a shaft, where the lubrication system is a forced lubrication system, where lubricant is driven under power to the shaft, where the shaft is horizontal with respect to a vertical axis, and the vertical axis is parallel with a direction of gravity, the shaft having:
a fluid passage, where the fluid passage has a centerline that is parallel and non-coaxial to an axis of rotation of the shaft, where the centerline is separated from the axis of rotation via a distance, where lubricant housed by the fluid passage has a fluid-free surface and is not driven by a pressure gradient; and
at least two axially spaced apart radial channels fluidly communicating with the fluid passage, where the axially spaced apart radial channels are inclined at different angles with respect to a plane that contains the axis of rotation and a central axis of the fluid passage.

15. The lubrication system of claim 14, where the transmission outputs torque to drive an on-highway vehicle, such as a passenger car.

16. The lubrication system of claim 14, where the transmission outputs torque to drive an off-highway vehicle.

17. The lubrication system of claim 14, where the transmission is an axle transmission.

18. The lubrication system of claim 14, where the transmission is a trans axle transmission.

* * * * *